(12) United States Patent
Livne et al.

(10) Patent No.: US 11,928,862 B2
(45) Date of Patent: Mar. 12, 2024

(54) METHOD, APPARATUS, AND SYSTEM FOR VISUALLY IDENTIFYING AND PAIRING RIDE PROVIDERS AND PASSENGERS

(71) Applicant: HERE Global B.V., Eindhoven (NL)

(72) Inventors: Ron Livne, Netanya (IL); Silviu Zilberman, Rishon le-Zion (IL)

(73) Assignee: HERE Global B.V., Eindhoven (NL)

( * ) Notice: Subject to any disclaimer, the term of this patent is extended or adjusted under 35 U.S.C. 154(b) by 345 days.

(21) Appl. No.: 17/487,913

(22) Filed: Sep. 28, 2021

(65) Prior Publication Data
US 2023/0095218 A1     Mar. 30, 2023

(51) Int. Cl.
| | |
|---|---|
| *G06V 20/20* | (2022.01) |
| *G06Q 50/30* | (2012.01) |
| *G06V 40/16* | (2022.01) |
| *H04N 23/60* | (2023.01) |
| *G06N 20/00* | (2019.01) |

(52) U.S. Cl.
CPC ............ *G06V 20/20* (2022.01); *G06Q 50/30* (2013.01); *G06V 40/172* (2022.01); *H04N 23/60* (2023.01); *G06N 20/00* (2019.01)

(58) Field of Classification Search
CPC ...... G06V 20/20; G06V 40/172; H04N 23/60; G06Q 50/30
See application file for complete search history.

(56) References Cited

U.S. PATENT DOCUMENTS 10,739,149 B2   8/2020   Chase et al.
11,348,281 B1*  5/2022   Tang .................... H04N 13/246
(Continued)

FOREIGN PATENT DOCUMENTS

| CN | 108510090 A | 9/2018 |
| CN | 110532919 A | 12/2019 |

(Continued)

OTHER PUBLICATIONS gps.gov, "GPS Accuracy", retrieved from https://www.gps.gov/systems/gps/performance/accuracy/, Aug. 6, 2021, 3 pages.
(Continued)

*Primary Examiner* — Edward Park
(74) *Attorney, Agent, or Firm* — DITTHAVONG, STEINER & MLOTKOWSKI

(57) ABSTRACT

An approach is disclosed for visually identifying and/or pairing ride providers and passengers. The approach involves, for example, receiving location data indicating that a driver vehicle is within a proximity threshold of a passenger pickup location. The approach also involves initiating an activation of a camera of a passenger device to present live imagery on the passenger device. The approach further involves processing sensor data collected from one or more sensors of the passenger device to determine a rotation vector indicating a pointing direction of the passenger device. The approach also involves determining a new direction to point the passenger device to capture the driver vehicle in a field of view of the camera based on the rotation vector and the location data. The approach further (Continued)

involves providing output data for presenting a representation of the new direction in a user interface of the passenger device.

20 Claims, 16 Drawing Sheets

(56) References Cited

U.S. PATENT DOCUMENTS

| | | | |
|---|---|---|---|
| 2009/0208054 A1* | 8/2009 | Angell | G06Q 90/00 |
| | | | 382/103 |
| 2019/0286928 A1 | 9/2019 | Hubschman et al. | |
| 2020/0134763 A1 | 4/2020 | Ghannam et al. | |
| 2020/0160705 A1 | 5/2020 | Chase | |
| 2021/0209797 A1* | 7/2021 | Lee | G06T 17/00 |
| 2023/0095218 A1* | 3/2023 | Livne | G06N 20/10 |
| | | | 382/118 |

FOREIGN PATENT DOCUMENTS

| | | |
|---|---|---|
| WO | 2012027781 A1 | 3/2012 |
| WO | 2019136066 A1 | 7/2019 |
| WO | 2020190254 A1 | 9/2020 |

OTHER PUBLICATIONS

Redmon et al., "An Incremental Improvement", retrieved from https://pjreddie.com/darknet/yolo/, 2018, 7 pages.

Wikipedia, "Automatic number-plate recognition", retrieved from https://www.wikiwand.com/en/Automatic_number-plate_recognition, 26 pages, Sep. 28, 2021.

Comaniciu et al., "Real-time tracking of non-rigid objects using mean shift", Published in Proceedings of the IEEE Computer Society Conference on Computer Vision and Pattern Recognition, vol. 2, May 2000, pp. 142-149.

OpenCV, "Cascade Classifier", retrieved from https://docs.opencv.org/3.4/db/d28/tutorial_cascade_classifier.html, Sep. 28, 2021, 6 pages.

"10 tips for taking a taxi in Bogota", retrieved Sep. 28, 2021 from https://www.howtobogota.com/2014/12/01/10-tips-taking-taxi-bogota/, 16 pages.

Hu et al., "Real-Time Taxi Detection for Embedded System", 17th International IEEE Conference on Intelligent Transportation Systems (ITSC), 2014, pp. 3112-3115.

Joshi, "Build Your Own Vehicle Detection Model Using OpenCV And Python", Apr. 21, 2020 retrieved from https://www.analyticsvidhya.com/blog/2020/04/vehicle-detection-opencv-python/, 14 pages.

* cited by examiner

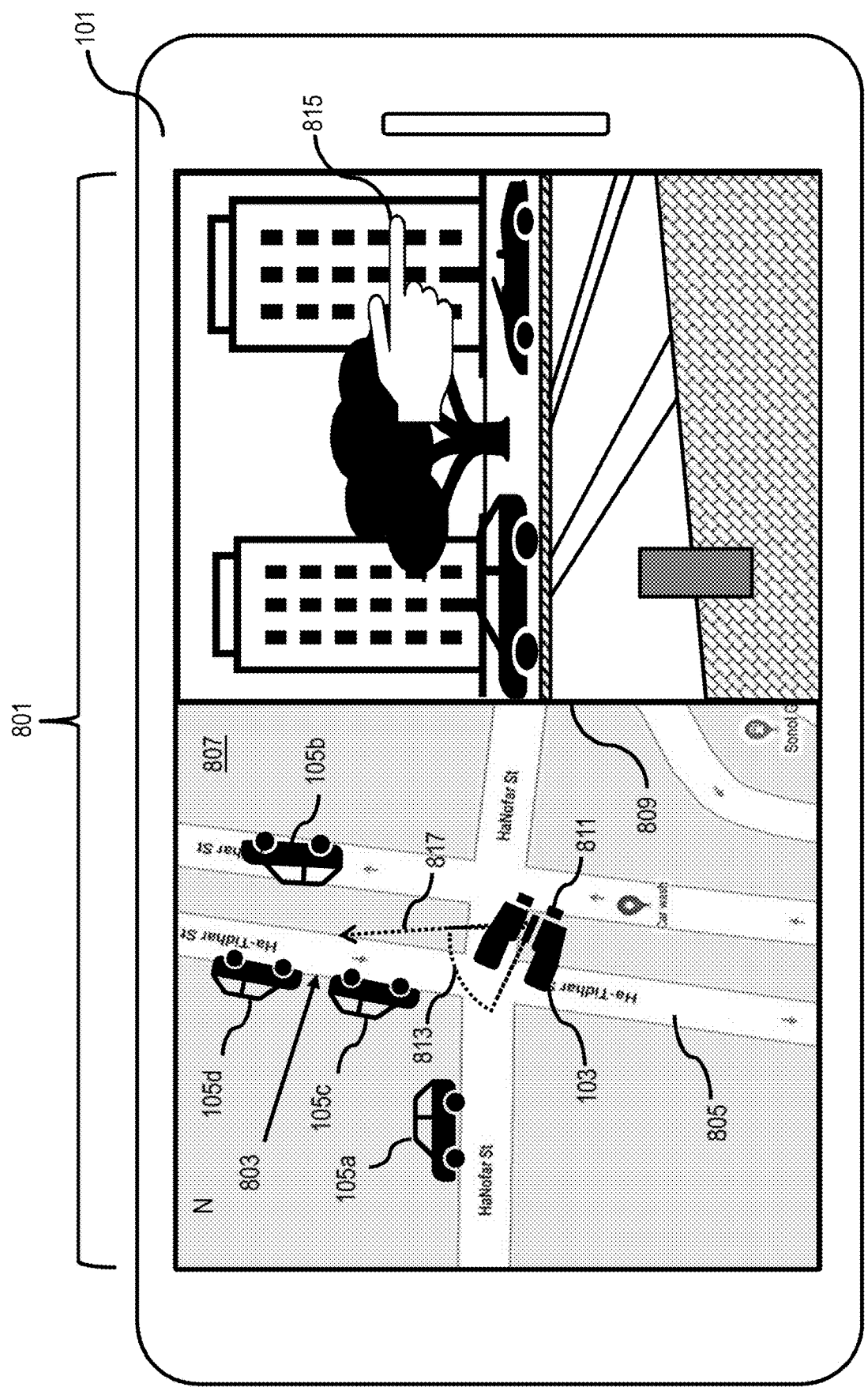

METHOD, APPARATUS, AND SYSTEM FOR VISUALLY IDENTIFYING AND PAIRING RIDE PROVIDERS AND PASSENGERS

BACKGROUND

Location-based service providers (e.g., mapping and navigation providers) are continually challenged to provide compelling services and applications. One area of development relates to ensuring that ride providers (e.g., taxis, ride-hailing or online ride services, autonomous vehicles, etc.) and passengers manage to meet. Unfortunately, in many cases, this seemingly simple process often fails. For example, a driver of a ride-hailing vehicle may stop or wait too far away from a passenger (e.g., due to global positioning system (GPS) location errors, address errors, or accessibility issues) or the driver and/or the vehicle (e.g., an autonomous vehicle) may be stopped or waiting for the passenger on the "wrong" side of a multi-lane/multi-direction road, a busy intersection, etc., making the identification of the ride provider or the passenger difficult. Moreover, as online ride services continue to grow in popularity and the numbers of ride providers and passengers increase accordingly, particularly in urban cities, the problems of inconvenience, frustration, and/or potential danger are likely to increase as well. Accordingly, service providers face significant technical challenges to identify and/or pair ride providers and passengers with minimal user latency and inconvenience.

Some Example Embodiments

Therefore, there is a need for identifying and/or pairing ride providers and passengers with minimal user latency and inconvenience.

According to one embodiment, a method comprises receiving location data indicating that a driver vehicle is within a proximity threshold of a passenger pickup location. The method also comprises initiating an activation of a camera of a passenger device to present live imagery on the passenger device. The method further comprises processing sensor data collected from one or more sensors of the passenger device to determine a rotation vector indicating a pointing direction of the passenger device. The method also comprises determining a new direction to point the passenger device to capture the driver vehicle in a field of view of the camera based on the rotation vector and the location data. The method further comprises providing output data for presenting a representation of the new direction in a user interface of the passenger device.

According to another embodiment, an apparatus comprises at least one processor, and at least one memory including computer program code for one or more computer programs, the at least one memory and the computer program code configured to, with the at least one processor, cause, at least in part, the apparatus to initiate an activation of a camera of a driver device to present live imagery on the driver device. The apparatus is also caused to process sensor data collected from one or more sensors of the driver device to determine a rotation vector indicating a pointing direction of the driver device. The apparatus is further caused to determine a new direction to point the driver device to capture a passenger associated with a passenger pickup location in a field view of the camera based on the rotation vector and location data of the passenger or a passenger device associated with the passenger. The apparatus is further caused to provide output data for presenting a representation of the new direction in a user interface of the driver device.

According to another embodiment, a non-transitory computer-readable storage medium having stored thereon one or more program instructions which, when executed by one or more processors, cause, at least in part, an apparatus to store driver data, passenger data, or a combination thereof, wherein the driver data relates to a driver or a driver vehicle associated with a ride request, and wherein the passenger data relates to a passenger associated with the ride request. The apparatus is also caused to initiate a transmission of the driver data, the passenger data, or a combination thereof to a driver device, a passenger device, or a combination thereof based on the ride request, wherein the driver data, the passenger data, or a combination thereof is presented in a user interface of the driver device, the passenger device, or a combination thereof; and wherein device sensor data of the driver device, the passenger device, or a combination thereof is processed to determine a direction to point the driver device, the passenger device, or a combination thereof to capture the driver, the driver vehicle, or the passenger in a field of view of a camera of the driver device, the passenger device, or a combination thereof.

According to another embodiment, an apparatus comprises means for receiving location data indicating that a driver vehicle is within a proximity threshold of a passenger pickup location. The apparatus also comprises means for initiating an activation of a camera of a passenger device to present live imagery on the passenger device. The apparatus further comprises means for processing sensor data collected from one or more sensors of the passenger device to determine a rotation vector indicating a pointing direction of the passenger device. The apparatus also comprises means for determining a new direction to point the passenger device to capture the driver vehicle in a field of view of the camera based on the rotation vector and the location data. The apparatus further comprises means for providing output data for presenting a representation of the new direction in a user interface of the passenger device.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing a method of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIGS. 8A through 8C are diagrams of example user interfaces capable of visually identifying and/or pairing ride providers and passengers from a passenger's perspective, according to example embodiment(s);

DESCRIPTION OF SOME EMBODIMENTS

Examples of a method, apparatus, and computer program for visually identifying and/or pairing ride providers and passengers are disclosed. In the following description, for the purposes of explanation, numerous specific details are set forth to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form to avoid unnecessarily obscuring the embodiments of the invention.

Figure 1:
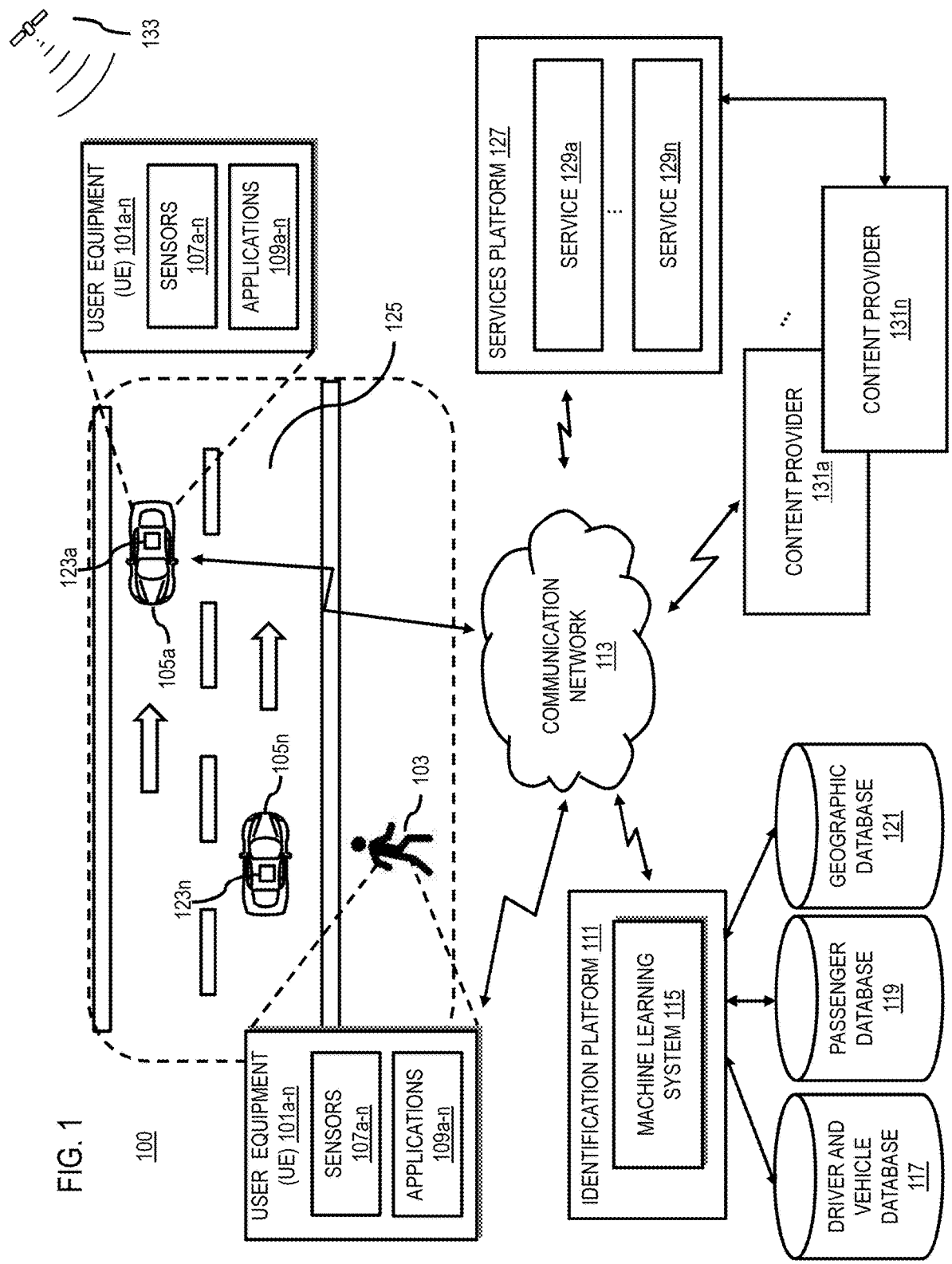
FIG. 1 is a diagram of a system capable of visually identifying and/or pairing ride providers and passengers, according to example embodiment(s)

FIG. 1 is a diagram of a system capable of visually identifying and/or pairing ride providers (e.g., drivers/vehicles) and passengers (e.g., to-be passengers, potential passengers, actual passengers, or a combination thereof), according to example embodiment(s). As described above, location-based service providers (e.g., mapping and navigation providers) are continually challenged to provide compelling services and applications. One area of development relates to ensuring that ride providers (e.g., taxis, ride-hailing or online ride services, autonomous vehicles, etc.) and passengers can manage to meet to transport the passenger between points, places, or locations, etc. (e.g., for running an errand, a ride back and forth from a restaurant or bar, etc.). For example, online ride services have become very popular in the last 10-15 with the rise of various private ride hailing services.

However, one of the failure points in the process is making sure that a ride provider and a passenger manage to meet with minimal latency and inconvenience. In many cases, this seemingly simply process fails. For example, the ride provider (e.g., a driver of a ride-hailing vehicle or an autonomous vehicle) may park or stop the vehicle too far away from the passenger (e.g., due to global positioning system (GPS) location errors, address errors, or accessibility issues). In other cases, the driver or vehicle may park, or stop, or be waiting on the other side of a crowded junction, and the passenger may not know that it is waiting. Even in instances where the passenger knows that a driver or vehicle is waiting, there may still be situations (e.g., in crowded or densely populated cities) where the passenger is required to make unnecessarily difficult judgements as to which is the specific driver or vehicle that is waiting and/or whether the passenger should attempt to cross a busy road, intersection, etc.

In most real-world situations, this communication gap can be partially filled by phone conversations between a driver and a passenger. In addition, where accurate location information is available, the passenger/driver may be able to see each other on a map (e.g., a digital map at approximately 1-2 meters (m) resolution). However, this is rarely the case.

Accordingly, service providers face significant technical challenges to identify and/or pair ride providers and passengers with minimal user latency and inconvenience.

To address these technical problems, a system 100 of FIG. 1 introduces a capability to visually identifying and/or pair ride providers (e.g., drivers/vehicles) and passengers, according to example embodiment(s). In one embodiment, a central server of the system 100 can store or access a driver/vehicle database (e.g., including information or data such as pictures of drivers, vehicle models and makes, vehicle color, pictures of vehicles, license plates, and/or taxi IDs); a passenger database (e.g., including information or data such as facial pictures of passengers); and real-time locations of drivers and passengers (e.g., based on global positioning system (GPS) data, probe data, etc.).

In one embodiment, when the system 100 determines that a driver is approaching a passenger pickup location (e.g., or is already present at the location), the system 100 can prompt the passenger to turn or rotate the camera of her/his mobile device (e.g., a smartphone) in video mode (e.g., using a camera or video application). In one embodiment, the system 100 can determine the absolute orientation of the passenger's mobile device in earth frame of reference (EFOR) based on a rotation vector (RV) interface of the operating system (OS) of the mobile device. In one instance, the system 100 can generate one or more on screen indications (e.g., arrows) that can point or guide the passenger in the direction to turn to see the approaching or waiting driver/vehicle. In one embodiment, as the passenger turns towards the driver/vehicle and the system 100 determines that the camera is now pointed in the correct direction (e.g., the driver/vehicle being in the camera's field of view), the system 100 can minimize or stop the one or more on screen indications.

In one embodiment, when the system 100 determines that a passenger's camera is pointed in the correct direction (e.g., the driver/vehicle within the passenger's field of view), the system 100 can apply a set of image processing techniques to detect the vehicle in the image. In one instance, the system 100 can mark the vehicle in the frame and can provide driver details (e.g., including the driver's picture) on screen (e.g., via a camera or video application). In one embodiment, when the system 100 determines that the passenger has reached the vehicle, the system 100 can use a camera or video application, for example, to positively identify the driver based one or more face detection techniques (e.g., based on information or data stored in or accessible via a driver/vehicle database).

In one instance, when the system 100 determines that a driver is approaching or has reached a passenger pickup point, the system 100 can similarly prompt the driver to turn or rotate the camera of her/his mobile device (e.g., a smartphone) in video mode (e.g., using a camera or video application) in the direction of the passenger. In one embodiment, the system 100 can use the RV information of the driver's mobile device to generate one or more on screen indications (e.g., arrows) to point or guide the driver in the direction to turn her/his mobile device to see the passenger (e.g., within the driver's field of view). In one instance, the system 100 can then positively identify the passenger using one or more face detection techniques (e.g., based on information or data stored in or accessible via a passenger database).

In one embodiment, the system 100 of FIG. 1 may include one or more user equipment (UE) 101*a*-101*n* (also collectively or individually referred to as UEs 101 or a UE 101, respectively) (e.g., a mobile device, a smartphone, etc.) associated with a passenger 103 (e.g., an individual desiring transportation somewhere), one or more vehicles 105*a*-105*n* (also collectively or individually referred to as vehicles 105 or a vehicle 105, respectively) (e.g., ride hailing or online ride service vehicles, taxis, autonomous or semi-autonomous vehicles, etc.), or a combination thereof. In one embodiment, the UEs 101 include one or more device sensors 107*a*-107*n* (also collectively referred to as device sensors 107) (e.g., camera sensors, Light Detection and Ranging (LiDAR) sensors, GPS sensors, etc.), one or more application 109*a*-109*n* (also collectively referred to as applications 109) (e.g., camera/video applications, mapping or navigation applications, ride hailing applications, etc.), or a combination thereof.

In one instance, the UEs 101, the vehicles 105, or a combination thereof have connectivity to an identification platform 111 via a communication network 113. In one instance, the identification platform 113 includes a machine learning system 115 and has connectivity to a driver and vehicle database 117, a passenger database 119, and a geographic database 121. In one instance, the driver and vehicle database 117 can include apart from standard identifiers (e.g., license plates, taxi IDs, etc.), pictures of drivers, vehicle models and makers, vehicle color, pictures of vehicles, etc. In one instance, the passenger database 119 can include face pictures of passengers 103 and the geographic database 123 can include real-time location information of the drivers, the vehicles 105, the passengers 103, or a combination thereof.

In one embodiment, when the system 100 determines that a driver of a vehicle 105 or a vehicle 105 (e.g., an autonomous vehicle) is approach a pickup location (or is already there) (e.g., based on GPS data), the system 100 can prompt the passenger 103 to turn or rotate a camera 107 of a UE 101 (e.g., a smartphone) in video mode within an application 109 (e.g., a camera or video application 109).

In one instance, the device sensors 107 can include a multitude of sensors, including location sensors (physical and virtual) and an inertial measurement unit (IMU) with an accelerometer, a gyroscope, and a magnetometer. In one embodiment, the OS of the UEs 101 provides a RV sensor 107, which is a virtual sensor 107 that transforms between phone (UE 101) frame of reference (PFOR) and EFOR, thus allowing the system 100 to determine the orientation of a UE 101 in local north-east-up coordinates. In one instance, the system 100 can determine a UE 101's azimuth direction, as calculated from RV, and the vector direction from the passenger to a vehicle 105 (e.g., from GPS information). The passenger 103 can then be prompted by the system 100, for example, to turn or rotate in the direction of the vehicle 105. In one instance, the system 100 can determine the angular field of view of a camera 107 (e.g., approximately 60°). In one embodiment, the system 100 can prompt the passenger 103 to turn or rotate further (e.g., approximately 90°) when the vehicle 105 is no longer in the field of view, as depicted in FIG. 2.

Figure 2:
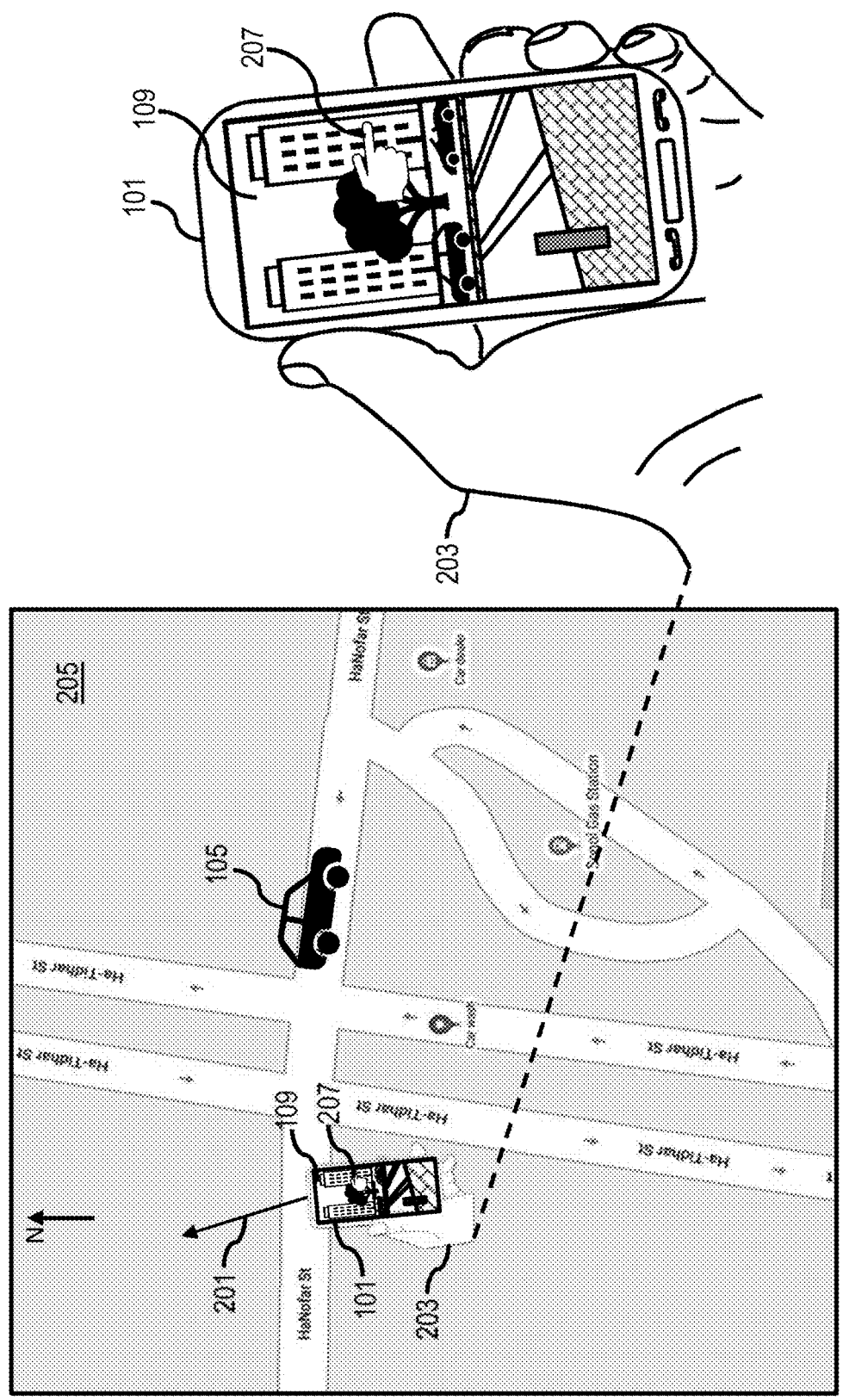
FIG. 2 is a diagram illustrating an example passenger orientation and on-screen indication to orient a passenger in the correct direction to see the ride provider, according to example embodiment(s)

FIG. 2 is a diagram illustrating an example passenger orientation and on-screen prompt to orient a passenger in the correct direction to see the ride provider, according to example embodiment(s). In this example, the passenger 103 is not facing the ride provider (e.g., a driver/vehicle 105) as depicted by the arrow 201 (e.g., pointing north-northwest) associated with the hand 203 holding a UE 101 (e.g., a smartphone) relative to the vehicle 105 on the digital map 205.

In one embodiment, the system 100 can determine based on the device sensors 107 of the UE 101 that the passenger 103 should turn or rotate approximately 90° in a clockwise direction, as depicted by the pointing finger 207 on top of the camera or video application 109. In one instance, as the passenger 103 turns left or right (e.g., right in this example) towards facing the vehicle 105, the system 100 can minimize or stop the display of the on-screen indicator.

In one embodiment, once the system 100 determines that the passenger UE 101 is facing the vehicle 105 (e.g., within the passenger 103's field of view), the system 100 can apply one or more image processing techniques (e.g., using heuristics, rules, etc., or in one embodiment, the machine learning system 115, etc.) to detect and to identify the vehicle 105 in the image (e.g., captured in a camera or video application 109).

In one instance, the system 100 can use one or more algorithms for detecting a vehicle 105 in an image (e.g., using heuristics, the machine learning system 115, etc.). In one instance, the system 100 can use an artificial intelligence (AI) based algorithm (e.g., YOLO3) that was already trained to detect multiple object types, including vehicles 105. Other alternatives are also available. An example of the system 100's vehicle 105 detection process output is shown in FIG. 3.

Figure 3:
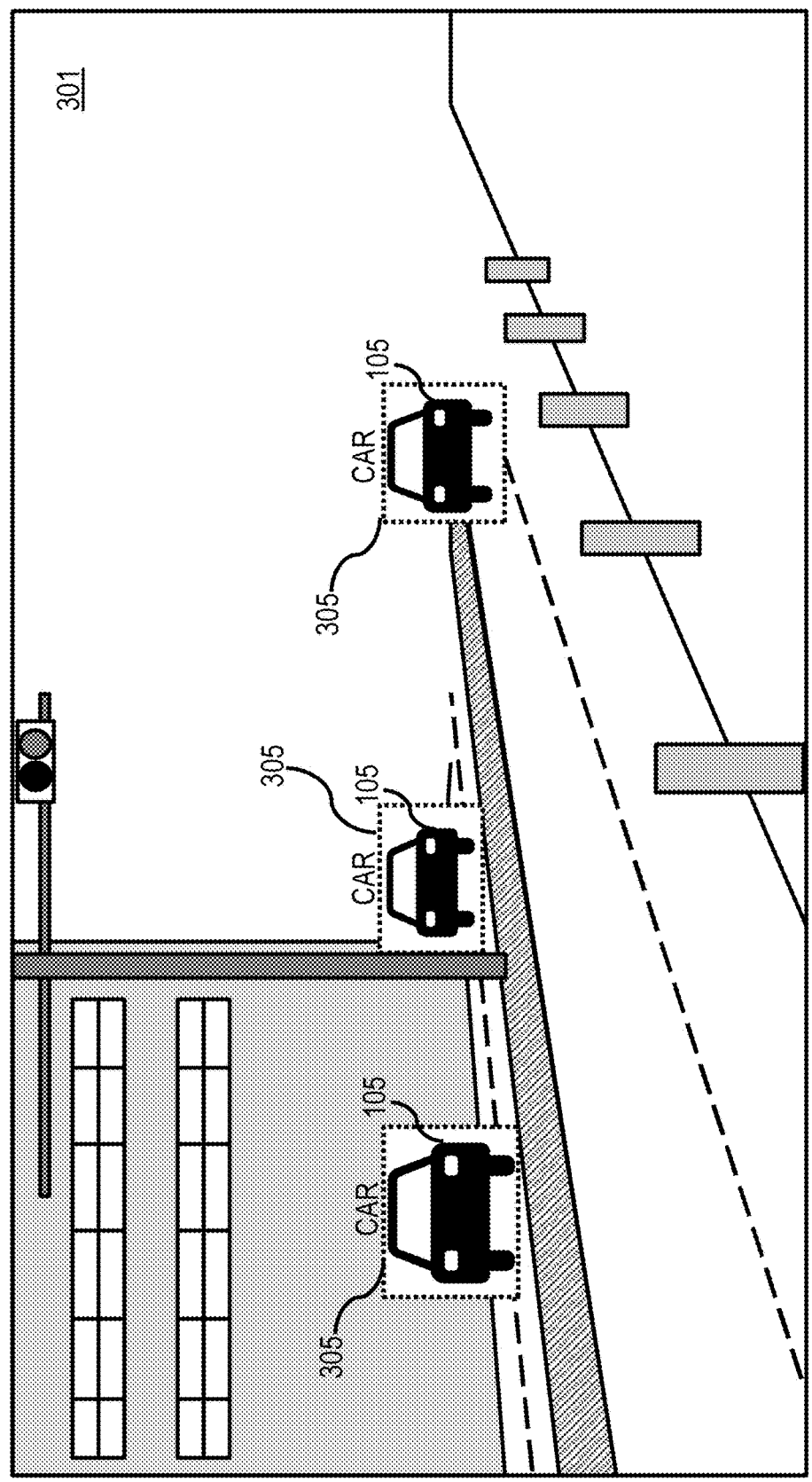
FIG. 3 is a diagram illustrating an example image-based vehicle detection process output, according to example embodiment(s)

FIG. 3 is a diagram illustrating an example image-based vehicle detection process output, according to example embodiment(s). Referring to FIG. 3, in this example, the image 301 (e.g., captured via a camera or video application 109) includes three vehicles 105, which the system 100 can identify and mark (as depicted by the boxes 303) in the image 301 using one or more algorithms (e.g., YOLO3).

In one embodiment, once the system 100 determines a set of candidate vehicles 105, the system 100 can analyze the image frame corresponding to each vehicle, focusing on any available known attributes. In one instance, the one or more attributes include, but are not limited to, (a) color; (b) plate number; (c) Taxi ID (e.g., in many states the Taxi ID is marked clearly on a vehicle 105); (d) car maker or manufacturer (e.g., based on insignia or logos); and (e) specific car model. In one instance, the system 100 can compare the image frames against one or more images of vehicles 105 stored in or accessible via the driver and vehicle database 117.

In one instance, once the system 100 detects the vehicle 105, the system 100 can use one or more common tracking algorithms (e.g., using heuristics, the machine learning system 115, etc.) to reduce computational load if necessary.

In one embodiment, when the system 100 determines that the passenger 103 has reached the vehicle 105, the system 100 can apply one or more face detection techniques (e.g., YOLO3, the Haar cascade-OpenCV library, etc.). In one embodiment, once the system 100 determines that the object is a face, the system 100 then employ one or more common face detection techniques to positively identify the passenger 103 (e.g., based on the information or data stored in or accessible via the passenger database 119). As a result, in one embodiment, the system 100 can identify and pair the driver and the passenger 103.

In one embodiment, from the driver's point of view, when the system 100 determines that a ride provider (e.g., a driver of a vehicle 105) is approaching or has reached a pickup location, the system 100 can prompt the driver or the vehicle 105 to turn the camera 107 of a UE 101 (e.g., a smartphone, an embedded navigation system) in video mode (e.g., using a camera or video application 109). In one instance, the system 100 can the detect and identify a passenger 103 similarly using one or more face detection and identification techniques to positively identify the passenger 103.

In one embodiment, in addition to matching or pairing a ride provider (e.g., a driver or a vehicle 105) with a passenger 103, the system 100 can transmit a message (e.g., via a messaging application 109, a navigation application 109, a ride hailing application 109, etc.) from the passenger to the driver of a vehicle 105 or to the vehicle 105 directly (e.g., an autonomous vehicle) to request or reserve a ride. For example, in many countries, street hailing might be difficult and sometimes dangerous, as there are no digital records of the ride taking place and/or the people involved. In addition, street hailing can require driver attention, thus distracting him/her and potentially increasing the risk of vehicle 105 accidents. In one embodiment, the system 100 can enable a passenger to rotate a passenger device to view driver information (e.g., images, ratings/reviews, etc.) of vehicles on a street to decide which vehicle/driver to reserve, enable the selected driver to view passenger information (e.g., images, ratings/reviews, etc.) to decide whether to accept the passenger's request, and enable the passenger and the driver to identify each other via facial recognition when the passenger approaching the vehicle. Consequently, the system 100 can minimize driver distraction while searching for street hailing passengers 103 and can improve the safety of both ride providers and passengers 103 since the passenger 103 has a digital record associated with the ride and/or travel.

Figure 4:
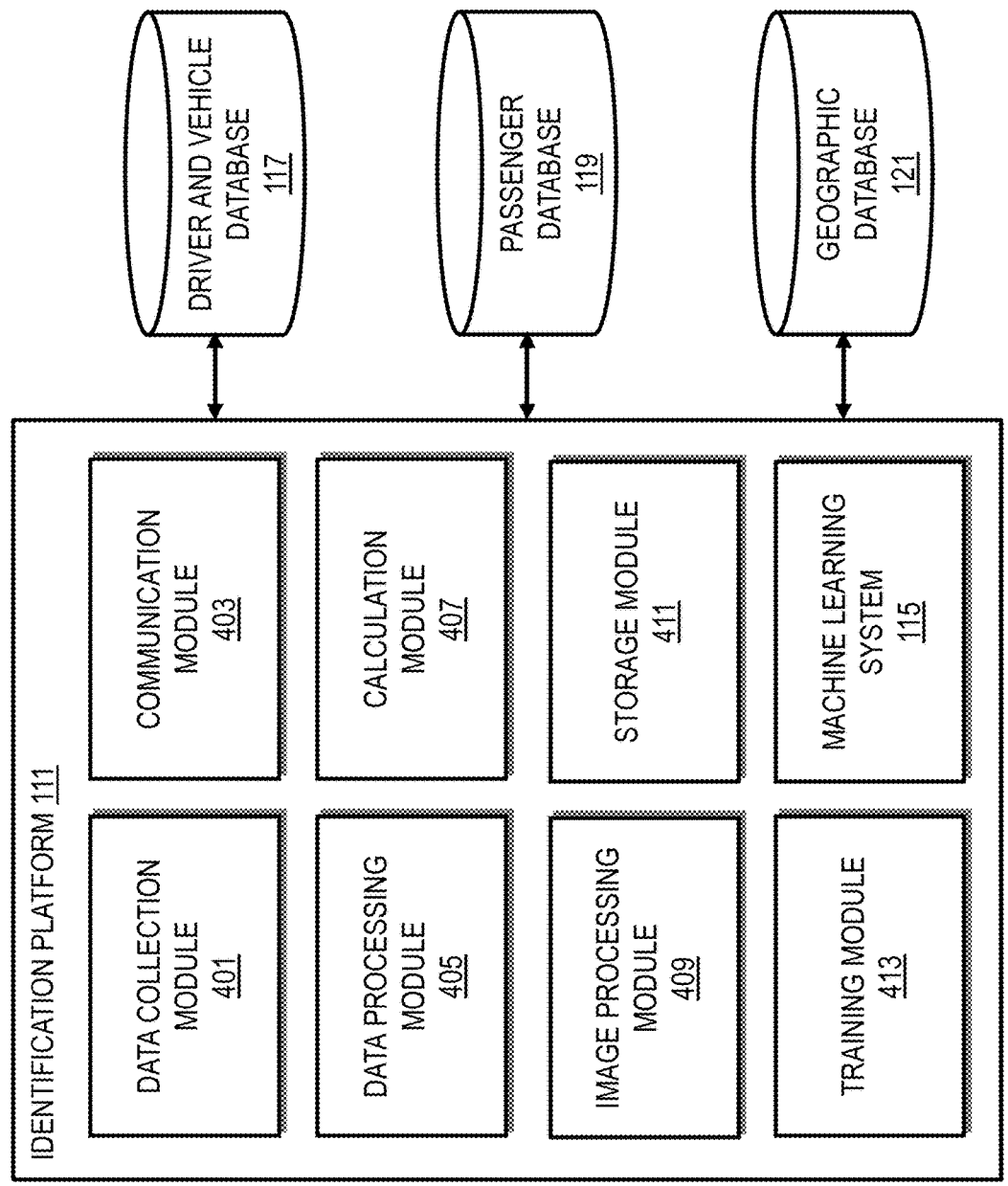
FIG. 4 is a diagram of the components of an identification platform capable of visually identifying and/or pairing ride providers and passengers, according to example embodiment(s)

FIG. 4 is a diagram of the components of the identification platform 111, according to example embodiment(s). By way of example, the identification platform 111 includes one or more components for visually identifying and/or pairing ride providers (e.g., drivers/vehicles) and passengers, according to example embodiment(s). It is contemplated that the functions of these components may be combined or performed by other components of equivalent functionality. In one embodiment, the identification platform 111 includes a data collection module 401, a communication module 403, a data processing module 405, a calculation module 407, an image processing module 409, a storage module 411, a training module 413, and the machine learning system 115, and has connectivity to the driver and vehicle database 117, the passenger database 119, and the geographic database 121. The above presented modules and components of the identification platform 111 can be implemented in hardware, firmware, software, or a combination thereof. Though depicted as a separate entity in FIG. 1, it is contemplated that the identification platform 111 may be implemented as a module of any other component of the system 100. In another embodiment, the identification platform 111 and/or the modules 401-413 may be implemented as a cloud-based service, local service, native application, or combination thereof. The functions of the identification platform 111, the machine learning system 115, and/or the modules 401-413 are discussed with respect to FIGS. 5-7.

Figure 5:
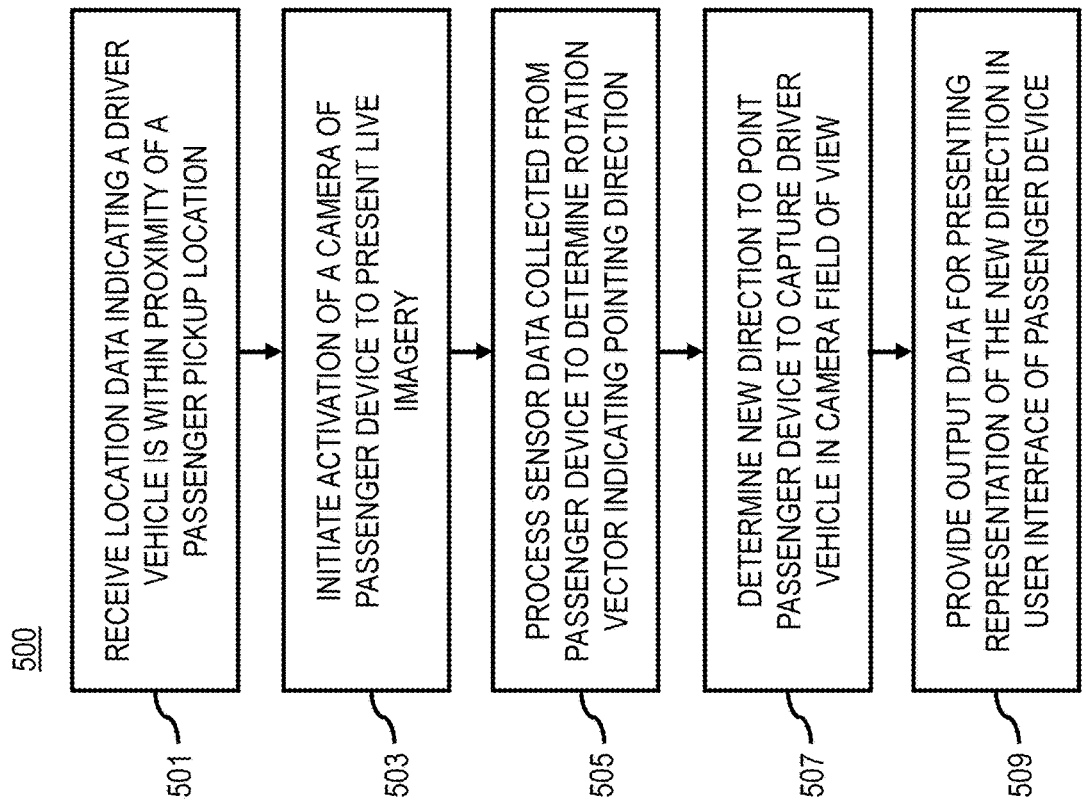
FIG. 5 is a flowchart of a process for visually identifying and/or pairing ride providers and passengers from a passenger's perspective, according to example embodiment(s)
Figure 12:
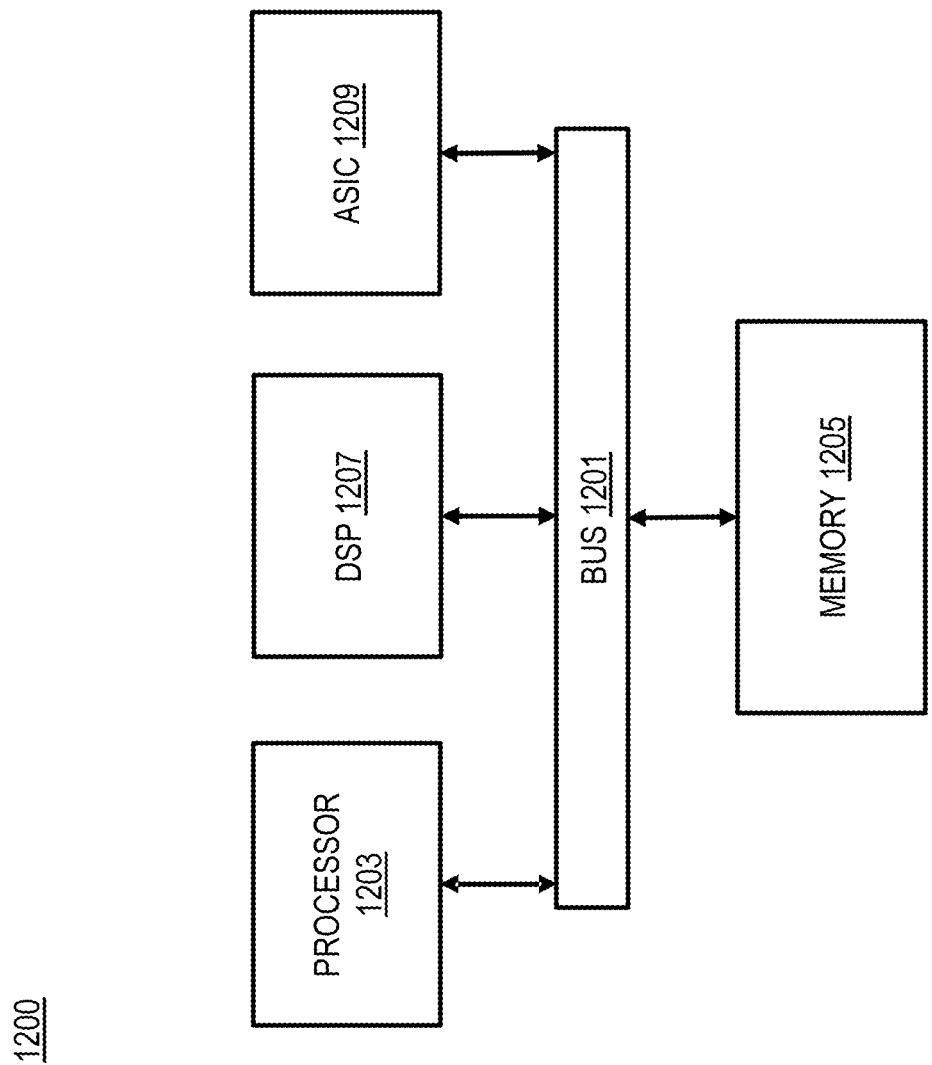
FIG. 12 is a diagram of a chip set that can be used to implement example embodiment(s)

FIG. 5 is a flowchart of a process for visually identifying and/or pairing ride providers and passengers from the perspective of a passenger device, according to example embodiment(s). In various embodiments, the identification platform 111, the machine learning system 115, and/or the modules 401-413 may perform one or more portions of the process 500 and may be implemented in, for instance, a chip set including a processor and a memory as shown in FIG. 12. As such, the identification platform 111, the machine learning system 115, and/or the modules 401-413 can provide means for accomplishing various parts of the process 500, as well as means for accomplishing embodiments of other processes described herein in conjunction with other components of the system 100. Although the process 500 is illustrated and described as a sequence of steps, it is contemplated that various embodiments of the process 500 may be performed in any order or combination and need not include all the illustrated steps.

In step 501, the data collection module 401 can receive location data indicating that a driver vehicle is within a proximity threshold of a passenger pickup location. In one embodiment, the location data comprises data (e.g., latitude, longitude, heading, etc.) received by the data collection module 401 from a UE 101 associated with a driver (e.g., a mobile device, a smartphone, etc.) or a vehicle 105 (e.g., an embedded navigation system), one or more vehicle sensors 123a-123n (also collectively referred to as vehicle sensors 123) (e.g., GPS sensors, LiDAR sensors, camera sensors, etc.), or a combination thereof. The receiving of the location data by the data collection module 401 can be important to enable the calculation module 407 to determine in which direction a passenger 103 should point a UE 101 (e.g., a mobile device, a smartphone, etc.) to view the driver vehicle 105 (e.g., using a camera or video application 109) as described in detail below.

In one instance, the location data can comprise, GPS data, probe data, or a combination thereof. In one instance, the probe data can include real-time location probes collected from the vehicle sensors 123, the UEs 101, or a combination thereof traveling a road link (e.g., the road or link 125). In one instance, the probe data may be reported as probe points, which are individual data records collected at a point in time that records telemetry data for that point in time. A probe point can include attributes such as: (1) probe ID, (2) longitude, (3) latitude, (4) heading, (5) speed, and (6) time.

In one instance, although the vehicles 105 are depicted as automobiles, it is contemplated that a driver vehicle 105 can be any type of public/private, ride hailing/ride sharing, manned or unmanned vehicle 105 (e.g., cars, trucks, buses, vans, motorcycles, scooters, bicycles, drones, etc.) that can pick up and/or transport a passenger 103 between two or more points, places, locations, etc. (e.g., a point of interest (POI), a home, an office, etc.). In one instance, the driver vehicle 105 can comprise a ride hailing or online ride service vehicle 105 (e.g., a taxi, a private ride hailing service vehicle, a livery car, etc.) driven by a human driver. The driver vehicle 105 may be, for instance, private (e.g., one passenger 103 per driver vehicle 105) or the driver vehicle 105 may be public or shared (e.g., a shared vehicle 105, a bus, a trolley, etc.). In one embodiment, the driver vehicle 105 can comprise an autonomous vehicle 105, a heavily assisted driving (HAD) vehicle, a semi-autonomous vehicle, or a combination thereof that can move or transport a passenger 103 between two or more points, places, locations, etc. without any human assistance or intervention. For example, a driver vehicle 105 may arrive at the passenger pickup location in an autonomous mode, but once the identification platform 111 "pairs" the driver vehicle 105 and the passenger 103, the passenger 103 can at least have the option to drive or operate the driver vehicle 105.

In one embodiment, the passenger pickup location comprises an area wherein a transportation transition activity can occur between the passenger 103 and the driver vehicle 105. By way of example, the passenger pickup location could be on or near a road (e.g., the road or link 125). In one instance, the passenger 103 could transition from walking to riding in the driver vehicle 105, from riding in a first driver vehicle 105 to riding in a second driver vehicle 105, from using a vehicle 105 (e.g., a bike or a scooter) to riding in a driver vehicle 105 (e.g., a car, etc.). In some instances, the passenger pickup location may be clearly delineated or easily recognizable (e.g., a bus stop); however, in other instances such as those mostly described herein, the exact passenger pickup location may be unknown or unclear to the passenger 103 and/or to the driver/vehicle 105 (e.g., due to GPS location errors, address errors, or accessibility issues). Thus, the need for the identification platform 111 to visually identify and/or pair the driver vehicle 105 and the passenger 103.

In step 503, the communication module 403 can initiate an activation of a camera of a passenger device to present live imagery on the passenger device. In one instance, initiating an activation of the camera 107 of a passenger device 101 (e.g., a camera sensor 107, a camera or video application 109, or a combination thereof) comprises transmitting an audio-visual-haptic prompt or notification to the passenger 103 via the passenger device 101. By way of example, the communication module 403 can communicate the audio-visual-haptic prompt to the passenger 103 via one or more applications 109, a user interface of the UE 101, one or more device sensors 107 (e.g., one or more lights, one or more sounds, one or more vibrations, or a combination thereof). In one embodiment, the communication module 403 can initiate an activation of the camera 107 (e.g., a camera sensor 107, a camera or video application 109, or a combination thereof) automatically and/or without user intervention when the data collection module 401 receives location data indicating that a driver vehicle 105 is within a proximity threshold (e.g., a relatively short walking distance) of a passenger 103 pickup location (e.g., a sidewalk, street corner, etc.).

In one instance, a passenger device comprises a UE 101 (e.g., a mobile device, a smartphone, etc.) owned, operated, held, or a combination thereof by a passenger 103 during and/or in connection with her or his attempt to ride or travel in a driver vehicle 105 (e.g., a taxi, a private ride hailing service vehicle, an autonomous vehicle, etc.). In one embodiment, the live imagery comprises one or more images captured or viewed in real-time by or through a camera sensor 107, a camera or video application 109, or a combination thereof. By way of example, initiating an activation of the camera 107 of the passenger's device 101 (whether via a generated prompt or automatically) is important to enable the data processing module 405 to determine an initial or starting orientation of the passenger device 101 in the local north-east-up coordinates.

In step 505, the data processing module 405 can process sensor data collected from one or more sensors of the passenger device to determine a rotation vector indicating a pointing direction of the passenger device. In one instance, the one or more device sensors 107 of the passenger device 101 include location sensors 107 (physical and virtual) and an IMU with accelerometer, gyroscope, and magnetometer sensors 107. In one instance, the sensor data can include location-based data (e.g., longitude, latitude, heading, etc.), IMU data (e.g., derived from the accelerometer, gyroscope, and magnetometer sensors 107), GPS data (e.g., derived from the GPS sensors 107), probe data, or a combination thereof. By way of example, determining the rotation vector of the passenger device 101 by the data processing module 405 is similarly important because based on the RV interface of the OS, the calculation module 407 can determine the absolute orientation of the passenger device in EFOR, which can enable the calculation module 407 to determine the orientation of the passenger device 101 in the local north-east-up coordinates.

In one embodiment, the calculation module 407 can determine an absolute orientation of the passenger device 101 (e.g., a mobile device, a smartphone, etc.) based on the RV and an EFOR, wherein the pointing direction (e.g., the direction the passenger 103 is initially facing) is further based on the absolute orientation. In one instance, the OS provides a RV sensor 107, which is a virtual sensor that transforms between PFOR and EFOR, thus allowing the calculation module 407 to determine the azimuth direction as calculated from RV, and the vector direction from the passenger 103 to the driver vehicle 105 (e.g., determined from GPS data). In other words, the calculation module 407 can determine the number of degrees and/or direction (e.g., clockwise or counterclockwise) the passenger 103 must turn or rotate with her/his UE 101 to face the driver vehicle 105 (i.e., to have the driver vehicle 105 in the field of view of the passenger device 101).

In step 507, the calculation module 407 can determine a new direction to point the passenger device to capture the driver vehicle in a field of view of the camera based on the rotation vector and the location data. In one instance, the new direction comprises the direction that the calculation module 407 determines that the passenger 103 needs to rotate the camera 107 of the passenger device 101 (e.g., a camera sensor 107, a camera or video application 109, or a combination thereof) for the driver vehicle 105 to be in the field of view of the passenger device 101. Following the example described with respect to FIG. 2, the calculation module 407 can determine that the passenger 103 needs to rotate her/his UE 101 90° to capture the driver vehicle 105. By way of example, the field of view of a camera 107 is the amount of observable world that a camera sensor 107 can capture at a given time.

In step 509, the communication module 403 can provide output data for presenting a representation of the new direction in a user interface of the passenger device. In one embodiment, the representation includes one or more indicators that can orient, direction, or point the passenger 103 in the direction of the driver vehicle 105 (e.g., within the field of view of a camera 107). By way of example, the representation of the new direction, the one or more indicators, or a combination thereof can be based on one or more common graphical elements (e.g., arrows, pointing fingers/ hands, etc.), one or more audio elements (e.g., tones of various pitch or intensity), one or more haptic elements (e.g., single or continuous vibrations), or a combination thereof. In one instance, the provision of the output data for presenting the representation of the new direction by the communication module 403 can be important to ensure that the passenger 103 can face the driver vehicle 105 with minimal latency and inconvenience.

In one embodiment, once the passenger device 101 (e.g., a mobile device, a smartphone, etc.) is facing the driver vehicle 105, the image processing module 409 can process the live imagery to detect the driver vehicle 105, wherein the output data further includes data for highlighting the driver vehicle 105 in the user interface of the passenger device 101. In one instance, the live imagery comprises one or more live or real-time images captured and/or viewed through a camera 107, a camera or video application 109, or a combination thereof associated with the passenger device 101. In one instance, the data for highlighting the driver vehicle 105 can include data or information associated with one or more visual symbols (e.g., an icon, an arrow, etc.), one or more audible symbols (e.g., a ring, a tone, a recorded voice such as "driver vehicle 105 now in view," etc.), one or more haptic gestures (e.g., a vibration), or a combination thereof.

In one instance, the image processing module 409 can process the live imagery (e.g., one or more real-time images derived via a camera or video application 109) to determine that the driver vehicle 105 is within the field of view of the passenger device 101. In other words, the imagine processing module 409 can detect the driver vehicle 105 based on the determination that the driver vehicle 105 is within the field of view of the passenger device 101.

In one embodiment, the communication module 403 can present an indication in the user interface (e.g., of a UE 101) that the driver vehicle 105 is within the field of view. In one instance, the user interface can comprise a camera or video application 109, a navigation or guidance application 109, a ride hailing application 109, or a combination thereof. In one embodiment, the indication comprises removing the representation of the pointing direction (e.g., the arrows, the pointing hand/fingers, etc.) from the user interface. In other words, the indication or the removing of the representation of the pointing direction is based on the rotation vector of the passenger device 101 relative to the determined new direction (e.g., the direction of the driver vehicle 105).

In one embodiment, the calculation module 407 can process device location data collected from a location sensor of the passenger device to determine that the passenger device is within an approach proximity of the driver vehicle. In one instance, the device 101 location data can comprise GPS data, probe data, longitude, latitude, heading, or a combination derived from the device sensors 107 (e.g., GPS sensors, probe sensors, camera sensors, IMU sensors, etc.). In one instance, the approach proximity comprises a relatively short walking distance and/or a minimum distance required by a camera 107 of a passenger device 101 to capture an image of a driver, a driver vehicle 105, or a combination thereof and to enable the image processing module 409, for example, to perform a facial recognition of the driver.

In one embodiment, once the calculation module 407 determines that the passenger device 101 (e.g., a mobile device, a smartphone, etc.) is within the approach proximity (e.g., based on the GPS sensors 107, camera sensors 107, or a combination thereof), the image processing module 409 can process the live imagery (e.g., one or more real-time images captured or viewed via a camera or video application 109) to perform a facial recognition of a driver of the driver vehicle 105. In one instance, the image processing module 409 can perform the facial recognition (e.g., using heuristics, rules, etc. or in some embodiments, the machine learning system 115) based on one or more real-time object detection techniques (e.g., YOLO3, Haar Cascades—OpenCV, etc.). By way of example, the performing of the facial recognition by the image processing module 409 is important to identify the driver within or exceeding a probability threshold (e.g., a positive identification) to minimize user inconvenience (e.g., a wrong driver) and to maximize safety (e.g., a correct and/or a predetermined driver).

In one embodiment, the calculation module 407 can determine a positive identification of the driver based on comparing the facial recognition to previously stored driver data, wherein an indication of the positive identification is presented in the user interface of the passenger device. In one instance, the positive identification is based on the calculation module 407 determines that the live imagery and the previously stored driver data (e.g., stored in or accessible via the driver vehicle database 117) match within or exceeding a probability threshold (i.e., more probable than not). In one instance, the calculation module 407 can determine the positive identification using heuristics, rules, etc. or in some embodiment, the machine learning system 115. For example, a positive identification may be based on the calculation module 407 matching a threshold number of unique facial characteristics or features. In one instance, the determination of the positive identification by the calculation module 407 and the presentation in the user interface of the passenger device 101 by the communication module 403 is important to ensure that the ride providers and passenger 103 can manage to meet each other with minimal latency and inconvenience and with maximum safety and assurance.

In one embodiment, the data collection module 401 can retrieve driver data associated with the driver vehicle. In one instance, the driver data includes a driver image, driver information (e.g., contact information, ratings, reviews, etc.), vehicle 105 image, vehicle 105 information (e.g., make or model, safety features, etc.), or a combination thereof. In one instance, the driver data can be stored in or accessed by the data collection module 401 in the driver and vehicle database 117. In one instance, the communication module 403 can provide the driver data in the output data for presentation in the user interface 109. In one embodiment, the presentation in the user interface 109 can be in connection with and/or adjacent to the data for highlighting the driver vehicle 105 in the user interface 109 of the passenger device 101, as depicted in FIG. 8C.

In one embodiment, the communication module 403 can initiate a receiving of location data, an activation of a camera, processing of sensor data, determining of a pointing direction, providing of output data, or a combination thereof based on receiving a ride request associated with a driver vehicle 105 and a passenger device 101. In one instance, a ride request can comprise a request or reservation transmitted by a passenger 103 to a driver/driver vehicle 105, a central server (e.g., the identification platform 111), or a combination thereof (e.g., via a passenger device 101, an application 109, or a combination thereof). In one embodiment, a ride request can comprise a pairing, a matching, a connecting, etc. of a ride provider (e.g., a driver/driver vehicle 105) and a passenger 103 (e.g., comprising a reservation) as determined by the calculation module 407, the machine learning system 115, or a combination thereof. In one instance, a passenger 103 or a driver can initiate a ride request via a passenger device 101/driver device 101, an application 109 (e.g., a navigation application 109, a ride-hailing service application 109, etc.), or a combination thereof.

In one embodiment, a ride request can be received and/or determined by the communication module 403 based on (a) a passenger 103 pointing or aiming a camera 107 of a passenger device 101 toward or at a driver vehicle 105 (e.g., a taxi); (b) the image processing module 409 identifying the driver/driver vehicle 105; and (c) the communication module 403 sending a ride request to a driver device 101 or a UE 101 of an autonomous vehicle 105 (e.g., an embedded navigation system). In one instance, the driver or driver vehicle 105 can then, for example, either accept the ride request (e.g., stop or wait for the ride hailing passenger 103) or decline the ride request (e.g., based on a previous reservation or a current use).

Figure 6:
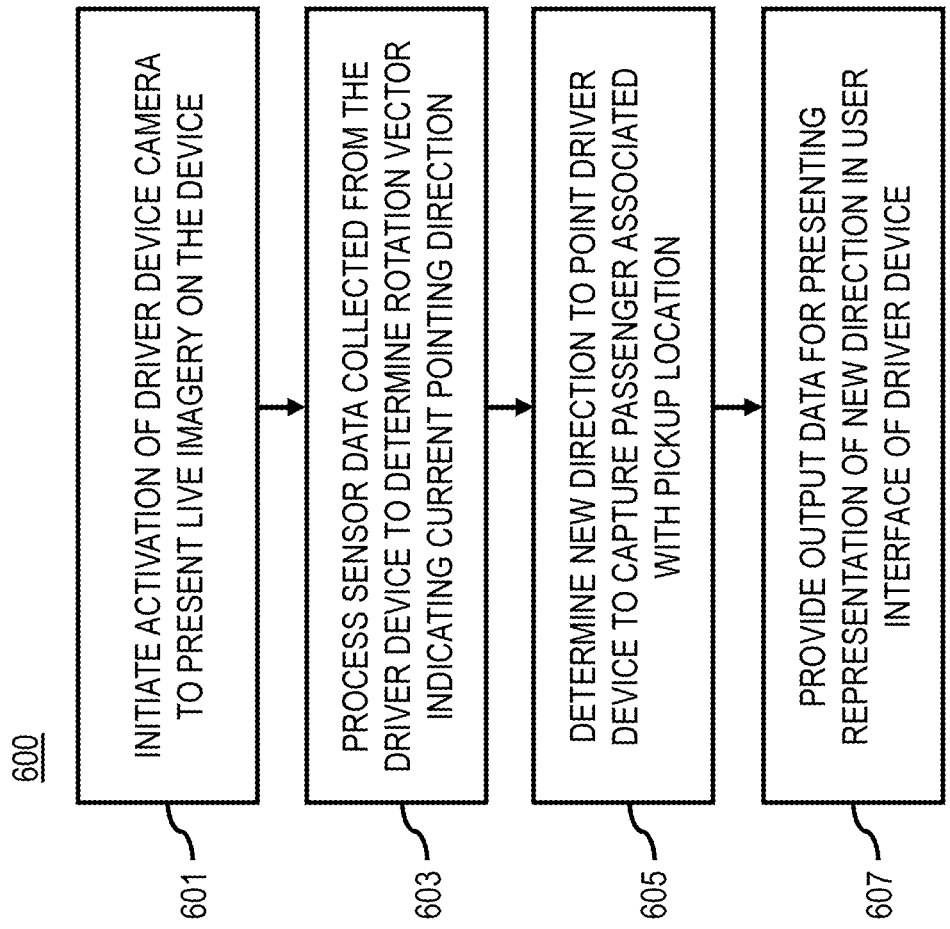
FIG. 6 is a flowchart of a process for visually identifying and/or pairing ride providers and passengers from a ride provider's perspective, according to example embodiment(s)

FIG. 6 is a flowchart of a process for visually identifying and/or pairing ride providers and passengers from the perspective of a driver device, according to example embodiment(s). In various embodiments, the identification platform 111, the machine learning system 115, and/or the modules 401-413 may perform one or more portions of the process 600 and may be implemented in, for instance, a chip set including a processor and a memory as shown in FIG. 12. As such, the identification platform 111, the machine learning system 115, and/or the modules 401-413 can provide means for accomplishing various parts of the process 600, as well as means for accomplishing embodiments of other processes described herein in conjunction with other components of the system 100. Although the process 600 is illustrated and described as a sequence of steps, it is contemplated that various embodiments of the process 600 may be performed in any order or combination and need not include all the illustrated steps. It is also contemplated that based on the position of a passenger device 101 relative to a driver device 101, that the identification platform 111, the machine learning system 115, and/or the modules 401-413 can accomplish various parts of the process 600 relative to the process 500 at a different time, at a same or substantially similar time, or a combination thereof.

In step 601, like the process described above with respect to step 503, the communication module 403 can initiate an activation of a camera of a driver device to present live imagery on the driver device. In one embodiment, the driver device 101 comprises a UE 101 (e.g., a mobile device, a smartphone, etc.) associated with a driver of a driver vehicle 105, a UE 101 associated with the driver vehicle 105 (e.g., an embedded navigation system), or a combination thereof. In one instance, each driver device 101 includes a camera 107 (e.g., a camera sensor 107, a camera or video application 109, or a combination thereof) and the live imagery comprises one or more real-time images captured and/or viewed via or through a camera or video application 109.

In one instance, like with the activation of the camera 107 of the passenger device 101 in step 503, the communication module 403 can initiate the activation by transmitting one or more audio-visual-haptic prompts or notifications to the driver via the driver device 101 and/or by automatically activating the camera 107 once the calculation module 407 determines that a passenger 103 is within a proximity threshold (e.g., a relatively short walking distance) of a passenger pickup location, the driver, the driver vehicle 105, or a combination thereof. In one embodiment, depending on the position or location of the passenger device 101 relative to the driver vehicle 105, the communication module 403 can initiate an activation of the camera 107 of the driver device 101 and an activation of a camera 107 of the passenger device 101 at different times, at or about the same time, or a combination thereof.

In one embodiment, wherein the driver vehicle 105 comprises an autonomous or semi-autonomous vehicle 105, the communication module 403 can automatically activate a camera 107 associated with a driver vehicle 105 (e.g., a front/back camera 107, a side camera 107, etc.) based on the calculation module 407 determining that a passenger 103 is within the proximity threshold (e.g., a relatively short walking distance, a minimal facial recognition distance, or a combination thereof).

In step 603, like the process described above with respect to step 505, the data processing module 405 can process sensor data collected from one or more sensors of the driver device to determine a rotation vector indicating a current pointing direction of the driver device. As similarly described above, in one instance, the one or more sensors 107 of the driver device 101 (e.g., a mobile device, a smartphone, an embedded navigation system, etc.) include location sensors 107 (physical and virtual) and IMU with accelerometer, gyroscope, and magnetometer sensors 107. In one instance, the sensor 107 data can include location-based data (e.g., longitude, latitude, heading, etc.), IMU data (e.g., derived from the accelerometer, gyroscope, and magnetometer sensors 107), GPS data (e.g., derived from the GPS sensors 107), probe data, or a combination thereof. In one embodiment, wherein the driver vehicle 105 comprises an autonomous or semi-autonomous vehicle 105, the one or more sensors can include one or more camera sensors 107/123 embedded or located at the front, the back, and/or the side of the driver vehicle 105.

In step 605, like the process described above with respect to step 507, the calculation module 407 can determine a new direction to point the driver device 101 to capture a passenger 103 associated with a passenger pickup location in the field view of a camera 107 based on the rotation vector and location data of a passenger device 101 associated with the passenger 103. As similarly described above, in one instance, the new direction comprises the direction that the calculation module 407 determines that the driver needs to turn a camera 107 of the driver device 101 or to turn the driver vehicle 105 for the passenger 103 and/or the passenger device 101 to be in the field of view of the driver device 101 and/or the driver vehicle 105.

In step 607, like the process described above with respect to step 509, the communication module 403 can provide output data for presenting a representation of the new direction in a user interface of the driver device. As similarly described above, in one embodiment, the representation comprises one or more indicators that can orient or point the driver, the driver device 101, and/or the driver vehicle 105 in the direction of the passenger 103 (e.g., within the field of view of a camera 107). By way of example, the representation of the new direction, the one or more indicators, or a combination thereof can be based on one or more common graphical elements (e.g., arrows, pointing fingers/hands, etc.), one or more audio elements (e.g., tones of various pitch or intensity), one or more haptic elements (e.g., single or continuous vibrations), or a combination thereof.

In one embodiment, as similarly described above with respect to the passenger device 101 perspective, once the driver device 101 (e.g., a mobile device, a smartphone, an embedded navigation system, etc.) is facing the passenger 103 (e.g., the to-be passenger 103 is within the field of view of the driver device 101), the imaging processing module 409 can process the live imagery to detect the passenger 103, wherein the output data (e.g., provided by the communication module 403) further includes data for highlighting the passenger 103 in the user interface of the driver device 101 (e.g., a smartphone). In one instance, the live imagery comprises one or more real-time images captured and/or viewed through a camera 107, a camera or video application 109, or a combination thereof associated with the driver device 101. In one instance, the data for highlighting the passenger 103 can include data or information associated with one or more visual symbols (e.g., an icon, an arrow, etc.), one or more audible symbols (e.g., a ring, a tone, a recorded voice such as "passenger 103 in sight," etc.), one or more haptic gestures (e.g., a vibration), or a combination thereof.

In one instance, as similarly described above with respect to the passenger device 101 perspective, once the calculation module 407 determines that a passenger device 101 (e.g., a mobile device, a smartphone, etc.) is within an approach proximity (e.g., based on GPS sensors 107), the image processing module 409 can process the live imagery (e.g., derived from a camera sensor 107) to perform a facial recognition of the passenger 103 (e.g., a passenger 103 approaching the driver vehicle 105). In one instance, the image processing module 409 can perform the facial recognition (e.g., using heuristics, rules, etc. or in some embodiments, the machine learning system 115) based on one or more real-time object detection techniques (e.g., YOLO3, Haar Cascades—OpenCV, etc.). By way of example, the performing of the facial recognition by the image processing module 409 is important to identify the passenger 103 within or exceeding a probability threshold (e.g., a positive identification) to minimize user inconvenience (e.g., a wrong passenger) and to maximize safety (e.g., a correct and/or predetermined passenger).

In one embodiment, the calculation module 407 can determine a positive identification of a passenger 103 based on comparing the facial recognition to previously stored passenger data (e.g., stored in or accessible via the passenger database 119), wherein an indication of the positive identification is presented in the user interface of the driver device 101 (e.g., a mobile device, a smartphone, an embedded navigation system, etc.). In one instance, the positive identification is based on the calculation module 407 determining that the live imagery and the previously stored passenger data (e.g., stored in or accessible via the passenger database 119) matches and/or exceeds a probability threshold (e.g., more probable than not). In one instance, the calculation module 407 can determine the positive identification using heuristics, rules, etc. or in some embodiments, the machine learning system 115. For example, the positive identification may be based on the calculation module 407 matching a threshold number of unique facial characteristics or features. In one instance, the determination of the positive identification by the calculation module 407 and the presentation in the user interface of the driver device 101 by the communication module 403 is important to ensure that ride providers and passengers 103 can manage to meet each other with minimal latency and inconvenience and with maximum safety and assurance.

In one embodiment, the data collection module 401 can retrieve passenger data associated with the passenger (e.g., for the purpose of facial recognition). In one instance, the passenger data is stored in or accessible by the data collection module 401 via the passenger database 119. In one instance, the communication module 403 can provide the passenger data in the output data for presentation in the user interface (e.g., of the driver device 101). In one instance, the communication module 403 can provide the passenger data in the output data for presentation in the user interface 109 of the driver device 101. In one embodiment, the presentation in the user interface 109 of the driver device 101 (e.g., a mobile device, a smartphone, an embedded navigation system, etc.) can be in connection with and/or adjacent to the data for highlighting the passenger 103 in the user interface 109 of the driver device 101, as depicted in FIG. 9B.

In one embodiment, the training module 413 and the machine learning system 115 can process the live imagery (e.g., one or more real-time images captured via a camera 107, a camera or video application 109, or a combination thereof) to detect a driver vehicle 105 and/or a passenger 103; to perform a facial detection and a facial recognition of a driver of a driver vehicle 105 or of a passenger 103; or a combination thereof. In one instance, the training module 413 and the machine learning system 115 can process sensor 107 data (e.g., longitude, latitude, heading, GPS data, probe data, etc.) to determine a rotation vector of a passenger device 101, a driver device 101, a driver vehicle 105 (e.g., an autonomous vehicle 105); a new direction to point a passenger device 101, a driver device 101/a driver vehicle 105, or a combination thereof to face a passenger 103, a driver/driver vehicle 105, or a combination thereof, respectively, such that the passenger 103 and the driver/driver vehicle 105 are in each other's respective fields of view. In one embodiment, the training module 413 and the machine learning system 115 can select and/or update respective weights or weighting schemes related to one or more inputs (e.g., facial characteristics or features) used by the image processing module 409 to process the live imagery to perform a facial detection and/or recognition of a driver of the driver vehicle 105, of a passenger 103, or a combination thereof.

In one instance, the training module 413 can continuously provide and/or update a machine learning module (e.g., a support vector machine (SVM), a neural network, decision tree, etc.) of the machine learning system 115 during training using, for instance, supervised deep convolution network or equivalents. By way of example, the training module 413 can train the machine learning module using one or more inputs (e.g., proximity threshold features, approach proximity features, probability threshold features, etc.), ground truth data (e.g., human verified faces or images), or a combination thereof to improve the time required and/or the resulting accuracy of provided output data, to minimize the cost or computational resources required, or a combination thereof.

Figure 7:
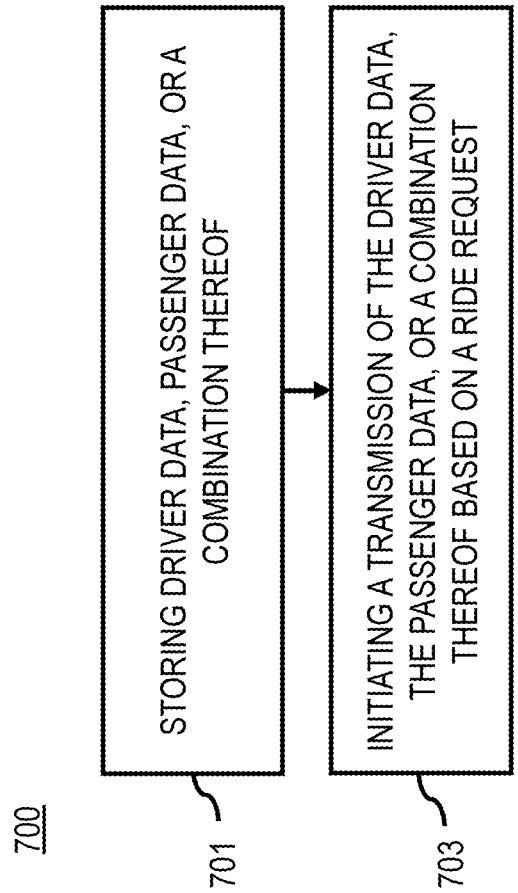
FIG. 7 is a flowchart of a process for visually identifying and/or pairing ride providers and passengers from a central server's perspective, according to example embodiment(s)

FIG. 7 is a flowchart of a process for visually identifying and/or pairing ride providers and passengers from a central server's perspective, according to example embodiment(s). In various embodiments, the identification platform 111, the machine learning system 115, and/or the modules 401-413 may perform one or more portions of the process 700 and may be implemented in, for instance, a chip set including a processor and a memory as shown in FIG. 12. As such, the identification platform 111, the machine learning system 115, and/or the modules 401-413 can provide means for accomplishing various parts of the process 700, as well as means for accomplishing embodiments of other processes described herein in conjunction with other components of the system 100. Although the process 700 is illustrated and described as a sequence of steps, it is contemplated that various embodiments of the process 700 may be performed in any order or combination and need not include all the illustrated steps. In one instance, the identification platform 111, the machine learning system 115, and/or the modules 401-413 can accomplish the various parts of the process 700 relative to the processes 500 and 600 at a different time, at a same or substantially similar time, or a combination thereof.

In step 701, the storage module 411 can store driver data, passenger data, or a combination thereof in a central server (e.g., the identification platform 111), wherein the driver data relates to a driver or a driver vehicle 105 associated with a ride request, and wherein the passenger data relates to a passenger 103 associated with the ride request. In one embodiment, the driver data (e.g., stored in or accessible via the driver and vehicle database 117) can include a driver image, a driver vehicle 105 image, or a combination thereof; and wherein the passenger data (e.g., stored in or accessible via the passenger database 119) can include a passenger 103 image, passenger information, or a combination thereof.

As described above with respect to step 509, a ride request can comprise a request or reservation transmitted by a passenger 103 to a driver/driver vehicle 105, a central server (e.g., the identification platform 111), or a combination thereof (e.g., via a passenger device 101, an application 109, or a combination thereof). In one instance, a ride request can comprise a pairing, a match, a connection, etc. of a ride provider (e.g., a driver/driver vehicle 105) and a passenger 103 (e.g., comprising a reservation) as determined by the calculation module 407, the machine learning system 115, or a combination thereof. In one instance, a passenger 103 or a driver can initiate a ride request via a passenger device 101/driver device 101, an application 109 (e.g., a navigation application 109, a ride-hailing service application 109, etc.), or a combination thereof.

In one embodiment, a ride request can be received and/or determined by the communication module 403 based on (a) a passenger 103 pointing a camera 107 of her/his passenger device 101 (e.g., a mobile device, a smartphone, etc.) toward a driver vehicle 105 (e.g., a taxi); (b) the image processing module 409 identifying the driver/driver vehicle 105; and (c) the communication module 403 sending a ride request to a driver device 101 or UE 101 of an autonomous vehicle 105 (e.g., an embedded navigation system). In one instance, the driver or driver vehicle 105 can either accept the ride request (e.g., stop or wait for the ride hailing passenger 103) or decline the ride request (e.g., based on a prior reservation or an ongoing use).

In step 703, the communication module 403 can initiate a transmission of the driver data, the passenger data, or a combination thereof to a driver device 101, a passenger device 101, or a combination thereof based on the ride request, wherein the driver data, the passenger data, or a combination thereof is presented in a user interface 109 of the driver device 101, the passenger device 101, or a combination thereof and wherein device sensor 107 data of the driver device 101, the passenger device 101, or a combination thereof is processed to determine a direction to point the driver device 101, the passenger device 101, or a combination thereof to capture the driver, the driver vehicle 105, or the passenger 103 in a field of view of a camera 107 of the driver device 101, the passenger device 101, or a combination thereof.

In one embodiment, as described above, the driver device can comprise a UE 101 associated with a driver of the driver vehicle 105 (e.g., a mobile device, a smartphone, etc.), a UE 101 associated with the driver vehicle 105 (e.g., an embedded navigation system), or a combination thereof. In one instance, each driver device 101 includes a camera 107 (e.g., a camera sensor 107, a camera or video application 109, or a combination thereof) and the live imagery comprises one or more images captured and/or viewed in real-time via a camera or video application 109. In one instance, a passenger device 101 can comprise a mobile device, a smartphone, etc. owned or associated with a passenger 103.

In one instance, like with respect to the activation of a camera 107 in steps 503 and 601, the communication module 403 can initiate the transmission of the driver data, the passenger data, or a combination thereof by transmitting one or more audio-visual-haptic prompts or notifications to the driver or driver vehicle 105 (e.g., an autonomous vehicle 105) and/or a passenger 103, and/or by automatically transmitting the driver data, the passenger data, or a combination therefore (e.g., stored in or accessible via the driver and vehicle database 117, passenger database 119, etc.) once the calculation module 407 determines that a passenger 103 is within a proximity threshold (e.g., a relatively short walking distance, a minimum facial recognition distance, or a combination thereof) of a passenger pickup location, a driver vehicle 105, or a combination thereof.

In one embodiment, the device sensor 107 data indicates a current pointing direction of the driver device 101, the passenger device 101, or a combination thereof as a rotation vector and an absolute orientation of the driver device, the passenger device, or a combination thereof is determined by the calculation module 407 in an EFOR from the RV; and wherein the direction to point the driver device 101, the passenger device 101, or a combination thereof is determined by the calculation module 407 based on the absolute orientation.

In one instance, the determination (e.g., by the imagine processing module 409) that the driver, the driver vehicle 105, the passenger 103, or a combination thereof is in the field of view of a camera 107 is based on a facial or object recognition processing of live or real-time imagery captured by a camera 107 of a driver device 101, a passenger device 101, or a combination thereof.

Figure 8B:
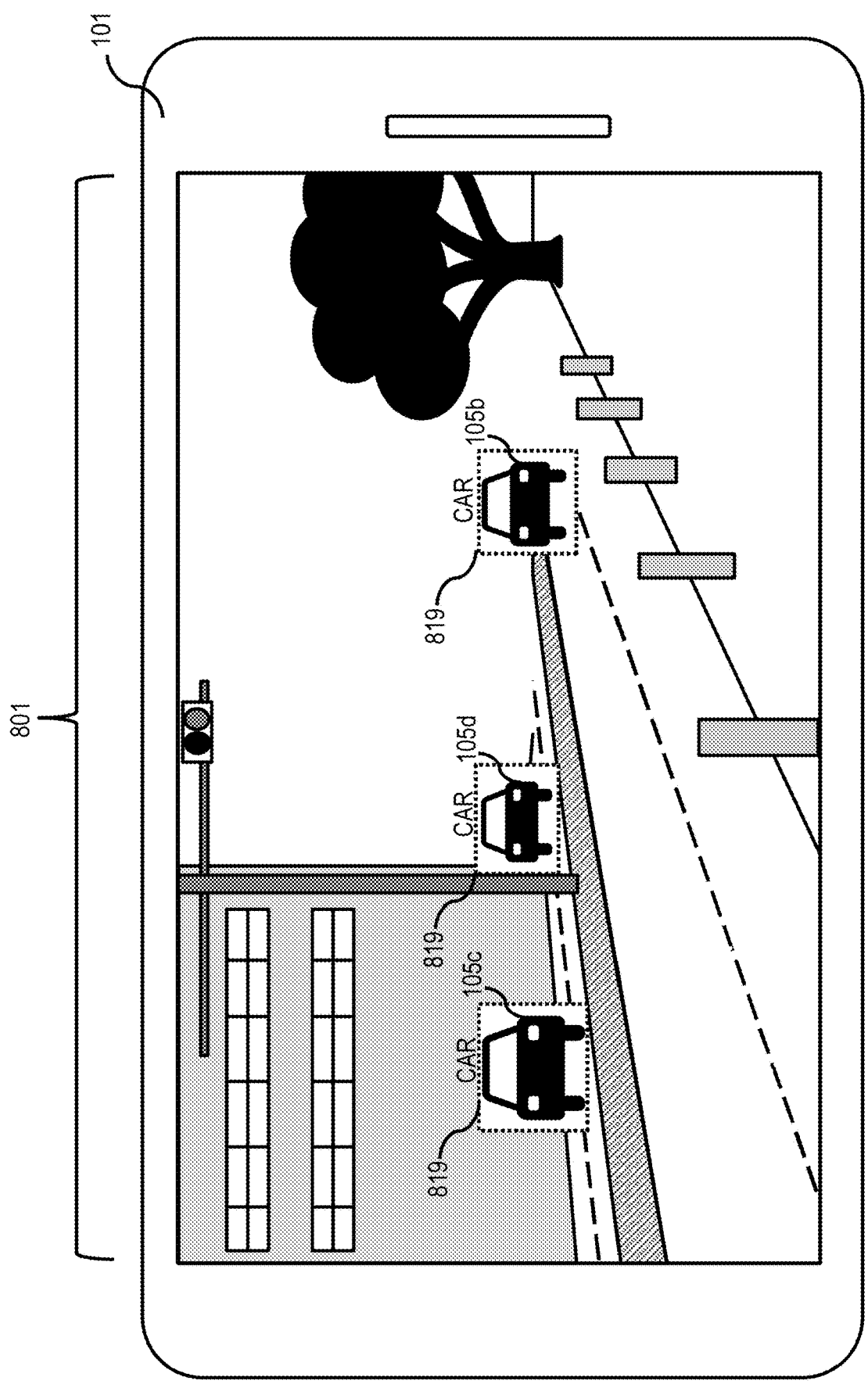
Figure 8C:
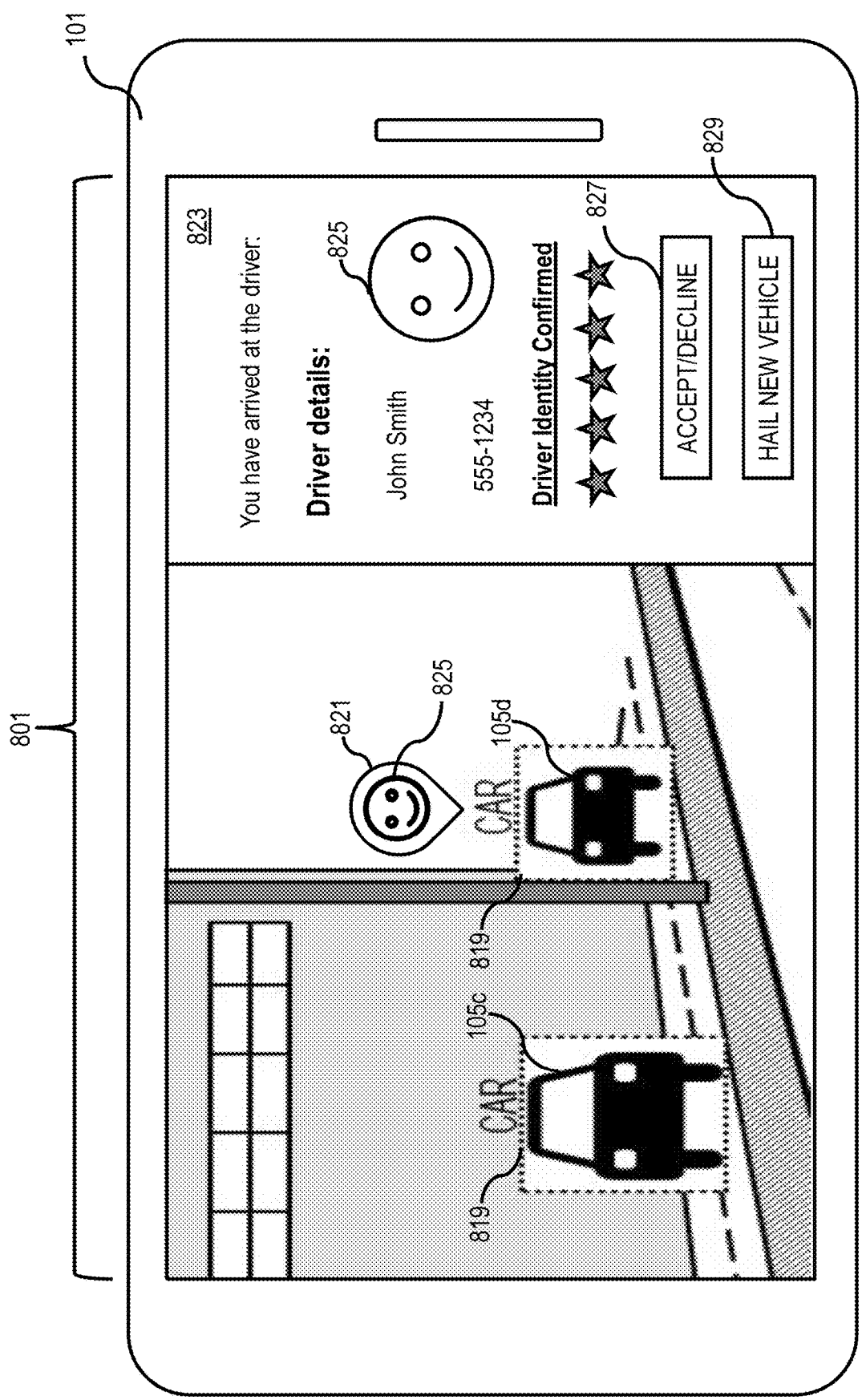

FIGS. 8A through 8C are diagrams of example user interfaces capable of visually identifying and/or pairing ride providers and passengers from a passenger's perspective, according to example embodiment(s). In this example, a live image-based UI 801 (e.g., a camera or video application 109, a navigation application 109, a ride hailing booking or reservation application 109, or a combination thereof) is generated for a UE 101 (e.g., a mobile device, a smartphone, etc.) that can be used to assist a passenger 103 and a ride provider (e.g., a driver/driver vehicle 105) manage to meet to transport or drive the passenger 103 between two or more locations (e.g., a home and an office, a home and a POI, etc.).

Referring to FIG. 8A, in one embodiment, as the driver of a vehicle 105 (e.g., a private ride hailing service vehicle 105*d*) approaches the passenger pickup location 803 (e.g., heading south on the road 805), the passenger 103 can turn or rotate a camera 107 associated with the UI 801 in video mode (e.g., via a camera or video application 109). In one instance, the system 100 can generate the UI 801 such that the video mode portion (e.g., captured or viewed via a camera 107, a camera or video application 109, or a combination thereof) can be viewed on one side of the UI 801 (e.g., the right side) and a bird's eye view portion showing the position and orientation of the passenger 103 relative to the vehicle 105*d* on the digital map 807 can be viewed (e.g., simultaneously) on another side of the UI 801 (e.g., the left side). In one instance, the system 100 can generate the UI 801 such that a passenger 103 can adjust or change the proportions of the two sides using one or more interactions with the UI 801 (e.g., by moving or sliding the border 809). In one instance, the one or more user interactions may include one or more physical interactions (e.g., a touch, a tap, a gesture, typing, etc.), one or more voice commands, or a combination thereof. In one instance, the system 100 can generate the UI 801 such that it can provide a passenger 103 with one or more audio cues or haptic feedback in response to one or more user interactions. In one embodiment, the system 100 can generate all the inputs described with respect to FIGS. 8A-8C and FIGS. 9A and 9B such that they all have the same functionality in terms of user interaction/operability.

In one embodiment, the system 100 can generate the UI 801 such that it includes an icon or symbol 811 (e.g., a pair of binoculars), wherein the direction of the icon 811 represents the current or real-time view or pointing direction of the passenger 103. In one instance, the system 100 can generate the UI 801 such that the rotation of the icon 811 and the pan of the live image are synchronized with each other. For example, if the passenger 103 turns (e.g., clockwise), a camera 107, a camera or video application 109, or a combination thereof will pan in real time in the same direction.

In one embodiment, based on an RV interface of the OS of the UE 101, the system 100 can determine the absolute orientation of the passenger device 101 in EFOR and then determine the azimuth direction 813. In one instance, the system 100 can generate the UI 801 such that the passenger 103 can see on the live image portion of the UI 801 one or more indicators (e.g., the pointing finger 815) that point or direct the passenger 103 in which direction to turn to see the vehicle 105*d*. In instance, the system 100 can also generate the UI 801 such that the passenger 103 sees a corresponding indicator (e.g., the arrow 817) relative to the digital map 807 to further prompt the passenger 103 in which direction to turn (e.g., clockwise). In one embodiment, as the passenger turns left or right (e.g., right in this example) towards the driver vehicle 105*d*, the system 100 can start to "ghost" (e.g., increase transparency) the one or more indicators (e.g., the pointing finger 815 and the arrow 817). Then, when the system 100 determines that the passenger 103 is facing in the correct direction, the system 100 can generate the UI 801 such that the one or more indicators (e.g., the pointing finger 815 and the arrow 817) are removed or are gone.

Referring to FIG. 8B, in one embodiment, the system 100 can apply a set of image processing techniques (e.g., one or more AI based algorithms using the machine learning system 115) to the live image capture or feed of the UI 801 to detect vehicles 105, as depicted by the boxes 819 and the labels (e.g., "car"). In one instance, the UI 801 of FIG. 8B can represent an example of the system 100's vehicle detection process output. In this example, the system 100 use the live image capture or feed of the UI 801 to detect and to mark at least three vehicles 105 (e.g., 105*c*, 105*d*, and 105*b*) according to the various embodiments described herein. In one instance, the system 100 can mark or identify the vehicle 105 of interest (e.g., 105*d*) in the live image UI 801 using one or more indicators or icons (e.g., icon 821), as depicted in FIG. 8C, and the driver details 823 (e.g., stored in or accessible via the driver and vehicle database 117) can be shown on the UI 801 including the driver's picture.

Referring to FIG. 8C, in one embodiment, the system 100 can generate the UI 801 such that the driver's details 823 include a picture 825 of the driver, driver information (e.g., a name, a contact number, a review or rating (e.g., a number of stars), etc. In one instance, when the passenger 103 reaches the driver vehicle 105*d*, the system 100 can perform one or more facial recognition techniques (e.g., using heuristics, rules, the machine learning system 115) to positively identify the driver. In one embodiment, the system 100 can generate the UI 801 such that upon a positive identification, the driver's picture 825 can appear in the icon 821 and the driver details 823 (e.g., name and number) can include one or more audio-visual-haptic confirmations (e.g., "You have arrived at the driver," "Driver Identity Confirmed," etc.). In one embodiment, the system 100 can generate the UI 801 such that it includes an input 827 (e.g., "Accept/Decline") to enable the passenger 103 to accept or decline a ride or transport in the driver vehicle 105. For example, the driver's rating displayed in the driver details 823 may be below a passenger's comfortability threshold. In one instance, the system 100 can determine to automatically accept or decline a driver or driver vehicle 105 (e.g., an autonomous vehicle 105) based on a preset or known reviews or ratings threshold. In one instance, the system 100 can generate the UI 801 such that it includes an input 829 (e.g., "hail new vehicle") to enable the passenger 103 to request a ride from a new vehicle 105 (e.g., a taxi, a ride hailing vehicle, etc.) using the UI 801.

Figure 9A:
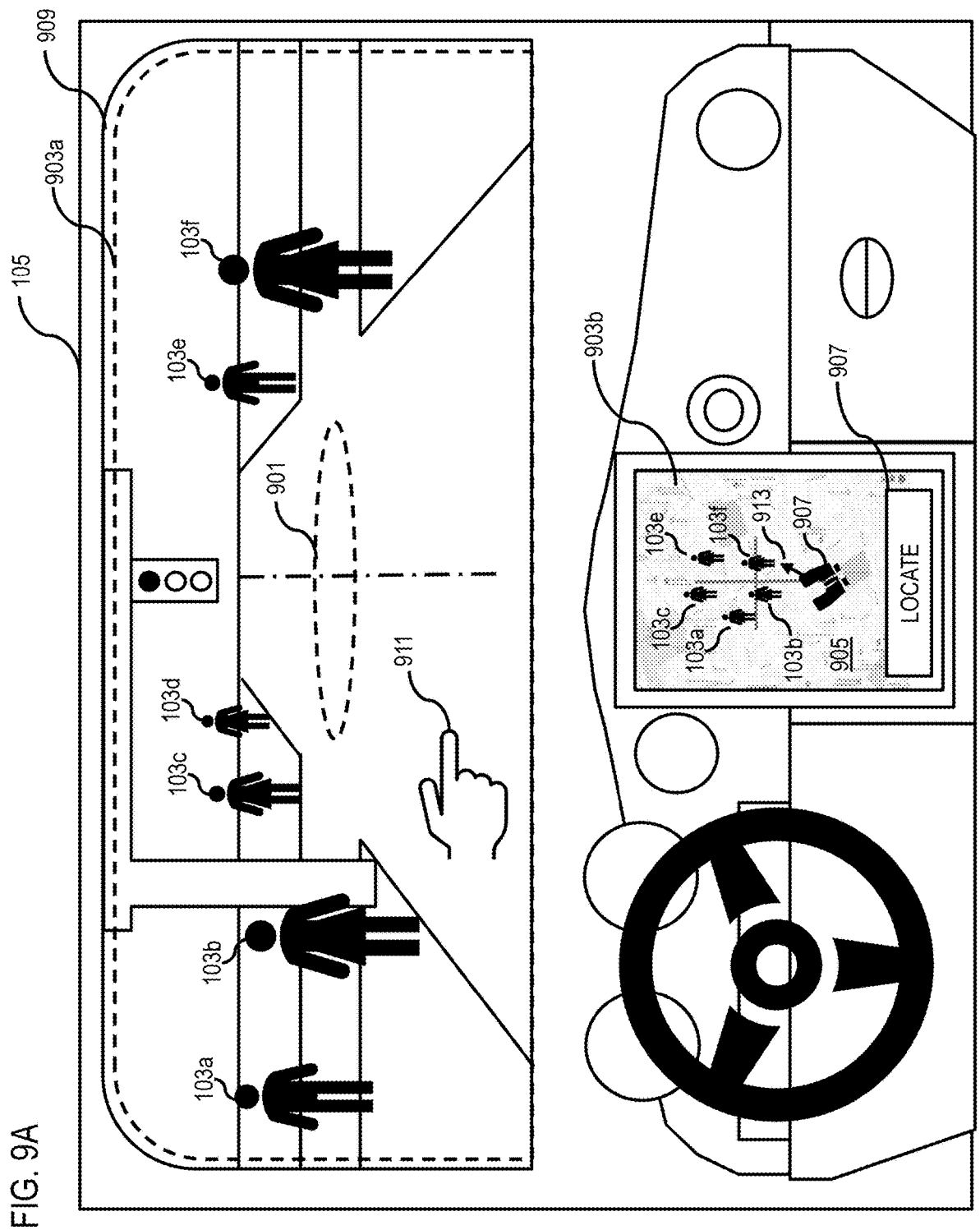
FIGS. 9A and 9B are diagrams of example user interfaces capable of visually identifying and/or pairing ride providers and passengers from a driver's perspective, according to example embodiment(s)
Figure 9B:
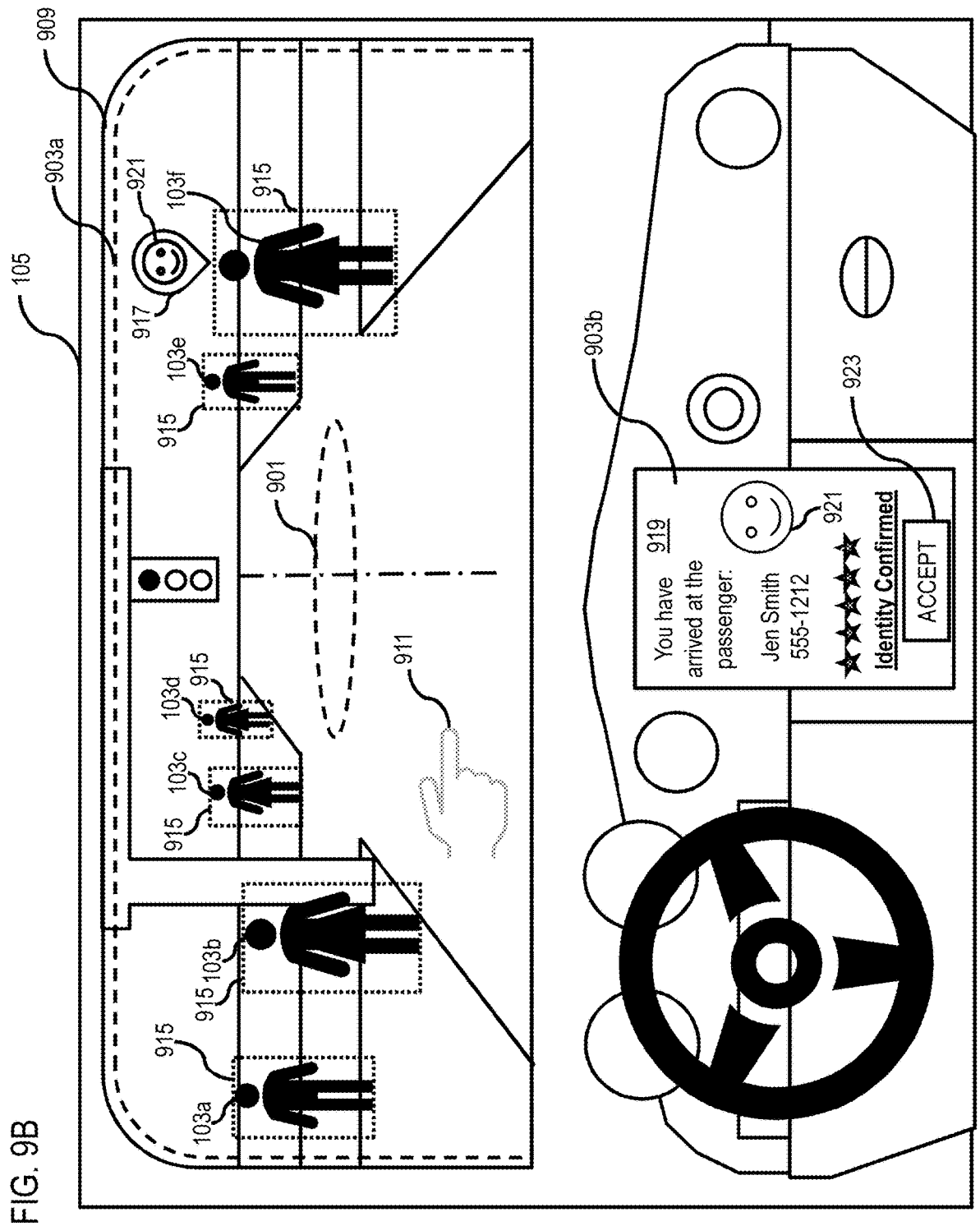

FIGS. 9A and 9B are diagrams of example user interfaces capable of visually identifying and/or pairing ride providers and passengers from a ride provider's perspective, according to example embodiment(s). In this example, a driver of a vehicle 105 (e.g., a ride hailing service vehicle 105) is driving towards the passenger pickup location 901 (e.g., at a busy intersection). In one embodiment, the system 100 can generate the UI 903 (like the UI 801) such that it includes a live image portion 903a (e.g., captured or viewed via a camera 107, a camera or video application 109, a head-up display (HUD) application 109, or a combination thereof) and a bird's eye view portion 903b showing the position and orientation of the driver/vehicle 105 relative to the passenger 103 on the digital map 905. In one instance, the system 100 can generate the UI 903 like the UI 801 such that it includes an icon or symbol 907 (e.g., a pair of binoculars), wherein the direction of the icon 907 represents the current or real-time view or pointing direction of the driver or the vehicle 105 (e.g., an autonomous vehicle 105).

In one embodiment, the system 100 can generate the UI 903a such that it is part of or integrated with a vehicle 105's windshield 909 (e.g., as part of a HUD). In one instance, the system 100 can generate the UI 903 (e.g., 903a and 903b) such that they display in real time the same or similar information. For example, as the pointing direction of the vehicle 105, a camera 107/123, or a combination thereof turns left or right, the icon 907 (e.g., binoculars) can rotate or turn left or right accordingly.

In one embodiment, the system 100 can generate the UI 903 such that it includes an input 907 (e.g., "locate") to enable a driver turn on or to activate the UI 901 (e.g., upon reaching or nearing the passenger pickup location 901) for the purpose of identifying the passenger 103. In one instance, when the system 100 determines that the vehicle 105 is within an approach proximity of the passenger 103 (e.g., based on the vehicle sensors 123, GPS data, probe data, or a combination thereof), the system 100 can automatically and/or without human intervention activate the UI 901.

In one instance, the system 100 can generate the UI 903 such that it includes one or more indicators that can point, orient, or guide the driver in which direction to turn or to look to see the passenger 103 (e.g., 103f). In one instance, the system 100 can generate, for example, a pointing finger 911 in the UI 903a and an arrow 913 in the UI 903b. In one embodiment, the system 100 can start to ghost or to remove the indicators 911 and 913 as the driver turns left or right (e.g., right in this example) towards the correct passenger 103 (e.g., 103f). In one instance, once the system 100 determines that the driver/vehicle 105 is facing in the correct direction (e.g., based on device sensors 107, vehicle sensors 123, or a combination thereof), the system 100 can generate the UI 901 such that the one or more indicators (e.g., the pointing finger 911 and the arrow 913) are removed, as depicted in FIG. 9B.

Referring to FIG. 9B, in one embodiment, the system 100 can apply a set of image processing techniques (e.g., one or more AI based algorithms using the machine learning system 115) to the live image capture or feed of the UI 903a to detect the passengers 103, as depicted by the boxes 915. In one instance, the UI 903 of FIG. 9B can represent an example of the system 100's passenger detection process output. In this example, the system 100 can use the live image capture or feed of the UI 903a to detect and to mark at least six passengers 103 (e.g., 103a-103f) according to the various embodiments described herein. In one instance, the system 100 can mark or identify the passenger 103 of interest (e.g., 103f) in the live image UI 901a using one or more indicators or icons (e.g., icon 917) and the passenger details 919 (e.g., stored in or accessible via the passenger database 119) can be shown on the UI 903b including the driver's picture 921.

In one embodiment, the system 100 can generate the UI 903b such that the passenger details 919 include a picture 921 of the passenger 103, passenger information (e.g., a name, a contact number, a review or a rating (e.g., number of stars)), etc. In one instance, when the driver reaches the passenger 103f, the system 100 can perform one or more facial recognition techniques (e.g., using heuristics, rules, the machine learning system 115) to positively identify the passenger 103f. In one embodiment, the system 100 can generate the UI 903a such that upon a positive identification, the passenger's picture 921 can appear in the icon 917 and the passenger details 919 can include one or more audio-visual-haptic confirmations (e.g., "You have arrived at the passenger," "Identity Confirmed," etc.). In one embodiment, the system 100 can generate the UI 903b such that it includes an input 923 (e.g., "Accept/Decline") to enable the driver to accept or to decline to provide a ride to the passenger 103 (e.g., 103f). For example, the passenger 103's ratings or reviews displayed in the passenger details 919 may be below a driver's comfortability threshold. In one embodiment, the system 100 can determine to automatically accept or decline a passenger 103 based on a preset reviews or ratings threshold.

Returning to FIG. 1, in one embodiment, the identification platform 111 has connectivity over the communication network 113 to the services platform 127 (e.g., an OEM platform) that provides one or more services 129a-129n (also collectivity referred to as services 129) (e.g., image processing services, probe and/or sensor data collection services, ride hailing or online ride services, etc.). By way of example, the services 129 may also be other third-party services and include mapping services, navigation services, ride hailing or ride sharing reservation or booking services (e.g., booking or reserving a driver vehicle 105), notification services, social networking services, content provisioning services (e.g., audio, video, images, etc.), application services, storage services, contextual information determination services, location-based services, information-based services (e.g., weather, news, etc.), etc. In one embodiment, the services platform 127 uses the output (e.g., positive identifications and/or pairings of ride providers and passengers 103, on screen direction indicators or arrows, etc.) to provide services such as navigation, mapping, other location-based services (e.g., fleet routing), etc. In one instance, the services 129 can provide representations of each driver and/or passenger 103 (e.g., a profile), driver and/or passenger information (e.g., name, contact, etc.), and a variety of other or additional information (e.g., a driver or a passenger 103 ride hailing service rating). In one instance, the services 129 can allow passengers 103 to share positively identified drivers or driver vehicles 105 (e.g., autonomous vehicles 105) within their individual networks (e.g., social network, work network, etc.) and/or provide for data portability. Likewise, in one instance, the services 129 can allow drivers and/or driver vehicles 105 to share positively identified passengers 103 within their network (e.g., among the fleet) and provide for data portability (e.g., between driver vehicles 105).

In one embodiment, the identification platform 111 may be a platform with multiple interconnected components and may include multiple servers, intelligent networking devices, computing devices, components, and corresponding software for visually identifying and/or pairing ride providers and passengers. In addition, it is noted that the identification platform 111 may be a separate entity of the system 100, a part of the one or more services 129, a part of the services platform 127, or included within the vehicles 105 (e.g., an embedded navigation system 101).

In one embodiment, content providers 131*a*-131*n* (also collectively referred to as content providers 131) may provide content or data (e.g., driver and vehicle data, passenger data, real-time location data, etc.) to the UEs 101, the vehicles 105, the applications 109, the identification platform 111, the machine learning system 115, the driver and vehicle database 117, the passenger database 119, the geographic database 121, the services platform 127, and the services 129. The content provided may be any type of content, such as map content, textual content, audio content, video content, image content (e.g., driver and passenger 103 facial images), etc. In one embodiment, the content providers 131 may provide content that may aid in localizing a vehicle 105 on a lane of a road segment (e.g., the road 125), link, and/or strand of a digital map (e.g., the digital maps 205, 807, and 905). In one embodiment, the content providers 131 may also store content associated with the vehicles 105, the identification platform 111, the machine learning system 115, the driver and vehicle database 117, the passenger database 119, the geographic database 121, the services platform 127, and/or the services 129. In another embodiment, the content providers 131 may manage access to a central repository of data, and offer a consistent, standard interface to data, such as a repository of the driver and vehicle database 117, the passenger database 119, the geographic database 121, or a combination thereof.

By way of example, the UEs 101 can be any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, fitness device, television receiver, radio broadcast receiver, electronic book device, game device, devices associated with one or more vehicles or any combination thereof, including the accessories and peripherals of these devices, or any combination thereof. It is also contemplated that a UE 101 can support any type of interface to the user (such as "wearable" circuitry, etc.). Also, the UEs 101 may be configured to access the communication network 113 by way of any known or still developing communication protocols. In one embodiment, the UEs 101 may include the identification platform 111 to visually identifying and/or pairing ride providers and passengers.

In one embodiment, the vehicles 105 can include various vehicle sensors 123 for generating or collecting vehicular sensor data, related geographic/map data, etc. In one embodiment, the sensed data represents sensor data associated with a geographic location or coordinates at which the sensor data was collected. In one embodiment, the probe data (e.g., stored in the geographic database 121) includes location probes collected by one or more vehicle sensors 123. In this way, the sensor data can act as observation data that can be aggregated into location-aware training and evaluation data sets (e.g., an artifact or input) for use by the machine learning system 115. By way of example, the vehicle sensors 123 may include a RADAR system, a LiDAR system, a global positioning sensor for gathering location data (e.g., GPS), a network detection sensor for detecting wireless signals or receivers for different short-range communications (e.g., Bluetooth, Wi-Fi, Li-Fi, near field communication (NFC) etc.), temporal information sensors, a camera/imaging sensor for capturing real-time or live image or video data, an audio recorder for gathering audio data, velocity sensors mounted on a steering wheel of the vehicles 105, switch sensors for determining whether one or more vehicle switches are engaged, and the like. Though depicted as automobiles, it is contemplated the vehicles 105 can be any type of manned or unmanned, public, private and/or shared vehicle 105 (e.g., cars, trucks, buses, vans, motorcycles, scooters, drones, etc.) that can travel on roads or links of a given area (e.g., the road or link 125) and can transport a passenger 103 between two or more points, places, locations, etc. (e.g., an office and a home, etc.).

Other examples of vehicle sensors 123 may include light sensors (e.g., for determining the amount of sunlight coming through the windshield 909), orientation sensors augmented with height sensors and acceleration sensor (e.g., an accelerometer can measure acceleration and can be used to determine orientation of the vehicle), tilt sensors to detect the degree of incline or decline of the vehicle 105 along a path of travel, moisture sensors, pressure sensors, etc. In a further example embodiment, vehicle sensors 123 about the perimeter of the vehicle 105 may detect the relative distance of the vehicle 105 from a passenger pickup/drop off location, a physical divider, a lane line of a link or a roadway, the presence of other vehicles 105, pedestrians (e.g., passengers 103), traffic lights, potholes and any other objects, or a combination thereof. In one scenario, the vehicle sensors 123 may detect weather data, traffic information, or a combination thereof. In one embodiment, the vehicles 105 may include vehicle sensors 123 such as GPS or other satellite-based receivers to obtain geographic coordinates from the one or more satellites 133 for determining current location and time. Further, a vehicle location within an area (e.g., the digital maps 205, 807, and/or 905) can be determined by visual odometry, triangulation systems such as A-GPS, Cell of Origin, or other location extrapolation technologies when cellular or network signals are available.

In one embodiment, the UEs 101 include device sensors 107 (e.g., a front facing camera, a rear facing camera, GPS sensors, an IMU including an accelerometer, gyroscope, and magnetometer, height sensors, tilt sensors, moisture sensors, pressure sensors, wireless network sensors, etc.) and applications 109 (e.g., camera or video applications, object detection and/or recognition applications, mapping applications, ride hailing booking or reservation applications, routing applications, guidance applications, navigation applications, etc.). In one example embodiment, the GPS sensors 107 can enable the UEs 101 to obtain geographic coordinates from satellites 133 for determining current or live location and time (e.g., relative to a vehicle 105). Further, a user location relative to a road (e.g., the road or link 125), driver vehicles 105, or a combination thereof may be determined by a triangulation system such as A-GPS, Cell of Origin, or other location extrapolation technologies when cellular or network signals are available.

It is noted therefore that the above-described data may be transmitted via the communication network 113 as probe data (e.g., GPS probe data) according to any known wireless communication protocols. For example, each vehicle 105, UE 101, application 109, and/or user, may be assigned a unique probe identifier (probe ID) for use in reporting or transmitting said probe data collected by the vehicles 105 and/or UEs 101. In one embodiment, each vehicle 105 and/or UE 101 is configured to report probe data as probe points, which are individual data records collected at a point in time that records telemetry data. Probes or probe points can be collected by the system 100 from the vehicles 105, UEs 101, applications 109, and/or the geographic database 121 in real-time, in batches, continuously, or at any other frequency requested by the system 100 over, for instance, the communication network 113 for processing by the identification platform 111, the machine learning system 115, or a combination thereof.

In one embodiment, the identification platform 111 retrieves aggregated probe points gathered and/or generated by the UEs 101 resulting from the travel of the UEs 101 and/or vehicles 105 on a road segment (e.g., link 125) within a given area (e.g., the area corresponding to the digital maps 205, 807, and/or 905). In one instance, the geographic database 121 stores a plurality of probe points and/or trajectories generated by different vehicles 105, UEs 101, applications 109, etc. over a period while traveling in a monitored area (e.g., the digital maps 205, 807, and/or 905). A time sequence of probe points specifies a trajectory—i.e., a path traversed by a vehicle 105, a UE 101, an application 109, etc. over the period.

In one embodiment, the communication network 113 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof.

By way of example, the UEs 101, the vehicles 105, the applications 109, the identification platform 111, the services platform 127, the services 129, the content providers 131, and/or the one or more satellites 133 communicate with each other and other components of the system 100 using well known, new or still developing protocols. In this context, a protocol includes a set of rules defining how the network nodes within the communication network 113 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

In one embodiment, the machine learning system 115 of the identification platform 111 can include a neural network or other machine learning system to tune and/or evaluate one or more heuristics, rules, algorithms, or a combination thereof for vehicle 105 detection and/or identification, passenger 103 or driver detection and/or identification, facial detection and/or identification, or a combination thereof. In one embodiment, the machine learning system 115 can tune and/or evaluate one or more object recognition algorithms using the data and information stored in or accessible via the driver and vehicle database 117, the passenger database, and/or the geographic database 121 (e.g., ground truth data). In one instance, the machine learning system 115 can select or assign respective weights, correlations, relationships, etc. among the one or more facial characteristics or features (e.g., based on facial pictures of drivers, facial pictures of passengers, etc.), vehicle 105 characteristics or features (e.g., based on car model and maker, car color, pictures of cars, etc.), or a combination thereof. In one embodiment, the machine learning system 115 can select or assign respective weights, correlations, relationships, etc. based on one or more algorithms (e.g., an AI algorithm) that was already trained to detect multiple object types, including vehicles 105. For example, the machine learning system 115 can assign relatively greater weight to identifications or pairings where the passenger 103 actually travels in the vehicle 105 or the driver or driver vehicle 105 actually transports a passenger 103 between locations (i.e., the ride was not declined). Likewise, the machine learning system 115 can assign relatively greater weight to identifications or pairings based on relatively recent driver or passenger 103 photographs (e.g., non-expired driver's licenses, passport photos, etc.).

In one embodiment, the machine learning system 115 can iteratively improve the speed and accuracy by which the system 100 can visually identify and/or pair ride providers (e.g., drivers and/or driver vehicles 105) and passengers 103; evaluate or rank one or more heuristics, rules, and/or algorithms for vehicle 105 and/or face detection/identification in a live or real time image, or a combination thereof.

Figure 10:
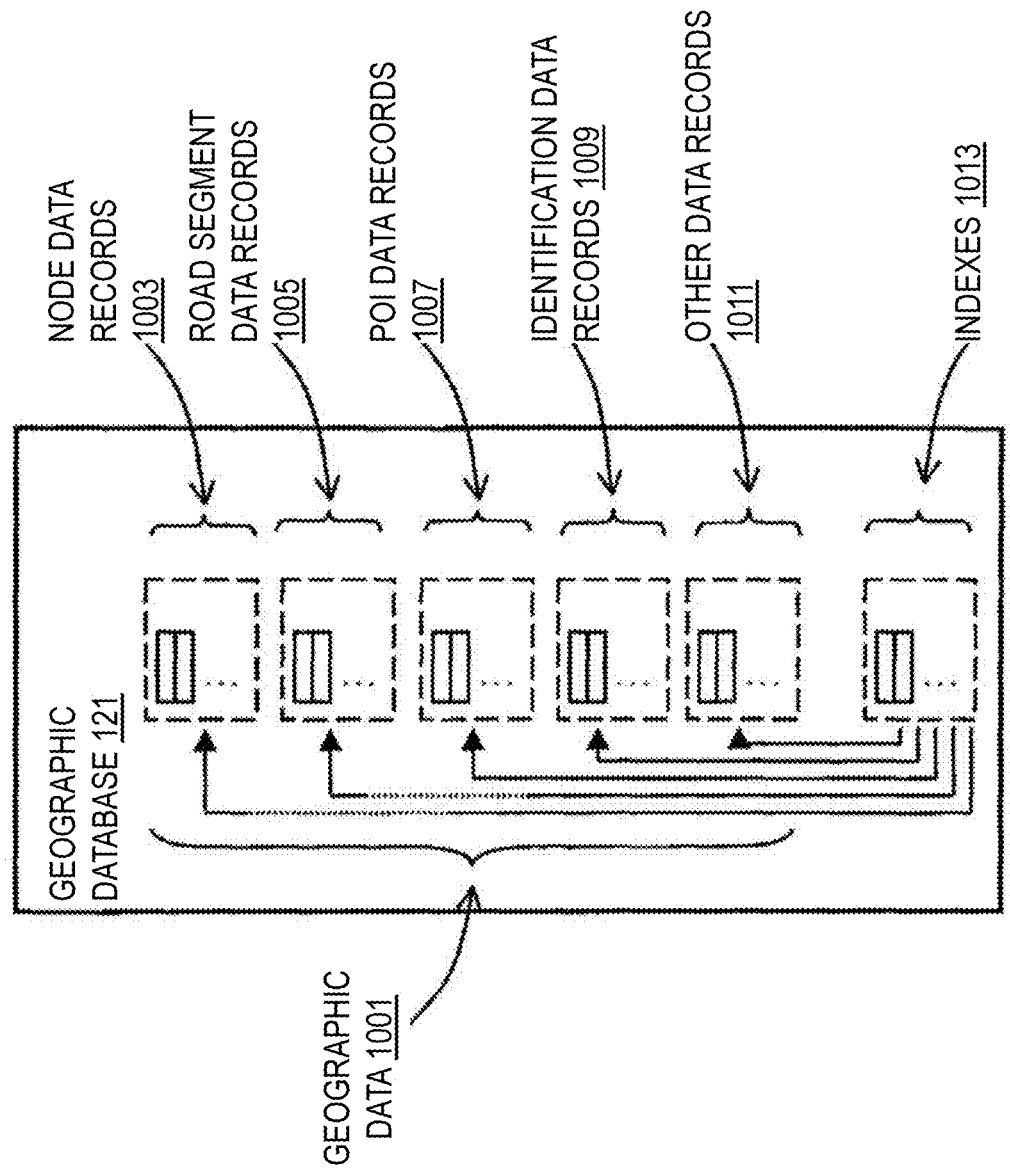
FIG. 10 is a diagram of a geographic database, according to example embodiment(s)

FIG. 10 is a diagram of a geographic database, according to example embodiment(s). In one embodiment, the geographic database 121 includes geographic data 1001 used for (or configured to be compiled to be used for) visually identifying and/or pairing ride providers and passengers. In one embodiment, geographic features (e.g., two-dimensional or three-dimensional features) are represented using polygons (e.g., two-dimensional features) or polygon extrusions (e.g., three-dimensional features). For example, the edges of the polygons correspond to the boundaries or edges of the respective geographic feature. In the case of a building, a two-dimensional polygon can be used to represent a footprint of the building, and a three-dimensional polygon extrusion can be used to represent the three-dimensional surfaces of the building. It is contemplated that although various embodiments are discussed with respect to two-dimensional polygons, it is contemplated that the embodiments are also applicable to three-dimensional polygon extrusions. Accordingly, the terms polygons and polygon extrusions as used herein can be used interchangeably.

In one embodiment, the following terminology applies to the representation of geographic features in the geographic database 121.

"Node"—A point that terminates a link.

"Line segment"—A straight line connecting two points.

"Link" (or "edge")—A contiguous, non-branching string of one or more-line segments terminating in a node at each end.

"Shape point"—A point along a link between two nodes (e.g., used to alter a shape of the link without defining new nodes).

"Oriented link"—A link that has a starting node (referred to as the "reference node") and an ending node (referred to as the "non reference node").

"Simple polygon"—An interior area of an outer boundary formed by a string of oriented links that begins and ends in one node. In one embodiment, a simple polygon does not cross itself.

"Polygon"—An area bounded by an outer boundary and none or at least one interior boundary (e.g., a hole or island). In one embodiment, a polygon (e.g., a hexagon) is constructed from one outer simple polygon and none or at least one inner simple polygon. A polygon is simple if it just consists of one simple polygon, or complex if it has at least one inner simple polygon.

In one embodiment, the geographic database 121 follows certain conventions. For example, links do not cross themselves and do not cross each other except at a node. Also, there are no duplicated shape points, nodes, or links. Two links that connect each other have a common node. In the geographic database 121, overlapping geographic features are represented by overlapping polygons. When polygons overlap, the boundary of one polygon crosses the boundary of the other polygon. In the geographic database 121, the location at which the boundary of one polygon intersects they boundary of another polygon is represented by a node. In one embodiment, a node may be used to represent other locations along the boundary of a polygon than a location at which the boundary of the polygon intersects the boundary of another polygon. In one embodiment, a shape point is not used to represent a point at which the boundary of a polygon intersects the boundary of another polygon.

As shown, the geographic database 121 includes node data records 1003, road segment or link data records 1005, POI data records 1007, identification data records 1009, other records 1011, and indexes 1013, for example. More, fewer, or different data records can be provided. In one embodiment, additional data records (not shown) can include cartographic ("carto") data records, routing data, and maneuver data. In one embodiment, the indexes 1013 may improve the speed of data retrieval operations in the geographic database 121. In one embodiment, the indexes 1013 may be used to quickly locate data without having to search every row in the geographic database 121 every time it is accessed. For example, in one embodiment, the indexes 1013 can be a spatial index of the polygon points associated with stored feature polygons.

In exemplary embodiments, the road segment data records 1005 are links or segments representing roads (e.g., road or link 125), streets, or paths (e.g., that are unique to an area) that can be used for verifying passenger pickup/drop off locations using probe data. The node data records 1003 are end points corresponding to the respective links or segments of the road segment data records 1005. The road link data records 1005 and the node data records 1003 represent a road network (e.g., a link 125), such as used by vehicles 105 and/or passengers 103 (e.g., pedestrians). Alternatively, the geographic database 121 can contain path segment and node data records or other data that represent pedestrian paths or areas in addition to or instead of the vehicle road record data, for example.

The road/link segments and nodes can be associated with attributes, such as geographic coordinates, street names, address ranges, speed limits, turn restrictions at intersections, and other navigation related attributes, as well as POIs, such as a restaurant, a retail shop, an office, etc. The geographic database 121 can include data about the POIs and their respective locations in the POI data records 1007. In one embodiment, the POI data records 1007 can include associated pickup/drop off locations, population density data, hours of operation, popularity or preference data, prices, ratings, reviews, and various other attributes. The geographic database 121 can also include data about places, such as cities, towns, or other communities, and other geographic features, such as bodies of water, mountain ranges, etc. Such place or feature data can be part of the POI data records 1007 or can be associated with POIs or POI data records 1007 (such as a data point used for displaying or representing a portion of a city).

In one embodiment, the geographic database 121 includes identification data records 1009 associated with driver and vehicle data records, passenger data records, or a combination therefore. In one instance, the identification data records 1009 comprise positive facial identifications of drivers of vehicles 105, vehicles 105, passengers 103, or a combination thereof It should be noted that the identification data records 1009 store and the system 100 uses such records in a privacy compliant way (e.g., based on local privacy rules) to ensure user privacy particularly since most data related to a driver or a passenger 103's identity, movement, preferences, etc. is highly sensitive data. In one embodiment, the identification data records 1009 can be associated with one or more of the node data records 1003, road segment or link records 1005, and/or POI data records 1007; or portions thereof (e.g., smaller or different segments than indicated in the road segment records 1005) to positively identify a driver, a driver vehicle 105 (e.g., an autonomous vehicle 105), a passenger 103, or a combination thereof.

In one embodiment, the geographic database 121 can be maintained by the services platform 127 (e.g., a map developer). The map developer can collect human movement data to generate and enhance the geographic database 121. There can be different ways used by the map developer to collect data. These ways can include obtaining data from other sources, such as taxi or medallion authorities, department of motor vehicles (DVM), municipalities or respective geographic authorities, humans monitoring traffic, crowd-sources, etc. In addition, the map developer can employ field personnel to travel by a vehicle 105 along one or more roads throughout an area of interest (e.g., the road or link 125) to observe and/or record positive identifications and/or pairings of ride providers and passengers 103. Similarly, the map developer can employ field personnel to travel by foot throughout an area of interest (e.g., the areas corresponding to the digital maps 205, 807, and/or 905) to observe or catalogue positive or errant identifications and/or pairings of drivers, driver vehicles 105, and passengers 103 (e.g., ground truth data). Also, remote sensing, such as aerial or satellite photography, can be used.

In one embodiment, the geographic database 121 includes high resolution or high definition (HD) mapping data that provide centimeter-level or better accuracy of map features. For example, the geographic database 121 can be based on LiDAR or equivalent technology to collect billions of 3D points and model road surfaces and other map features down to the number lanes and their widths. In one embodiment, the HD mapping data capture and store details such as the slope and curvature of the road, lane markings, roadside objects such as signposts, including what the signage denotes. By way of example, the HD mapping data enable highly automated vehicles 105 (e.g., autonomous vehicles, drones, HAD vehicles, semi-autonomous vehicles, etc.) to precisely localize themselves on a road (e.g., link 125), and to determine the road attributes (e.g., direction of traffic) at high accuracy levels.

In one embodiment, the geographic database 121 is stored as a hierarchical or multilevel tile-based projection or structure. More specifically, in one embodiment, the geographic database 121 may be defined according to a normalized Mercator projection. Other projections may be used. By way of example, the map tile grid of a Mercator or similar projection is a multilevel grid. Each cell or tile in a level of the map tile grid is divisible into the same number of tiles of that same level of grid. In other words, the initial level of the map tile grid (e.g., a level at the lowest zoom level) is divisible into four cells or rectangles. Each of those cells are in turn divisible into four cells, and so on until the highest zoom or resolution level of the projection is reached.

In one embodiment, the map tile grid may be numbered in a systematic fashion to define a tile identifier (tile ID). For example, the top left tile may be numbered 00, the top right tile may be numbered 01, the bottom left tile may be numbered 10, and the bottom right tile may be numbered 11. In one embodiment, each cell is divided into four rectangles and numbered by concatenating the parent tile ID and the new tile position. A variety of numbering schemes also is possible. Any number of levels with increasingly smaller geographic areas may represent the map tile grid. Any level (n) of the map tile grid has 2(n+1) cells. Accordingly, any tile of the level (n) has a geographic area of A/2(n+1) where A is the total geographic area of the world or the total area of the map tile grid 10. Because of the numbering system, the exact position of any tile in any level of the map tile grid or projection may be uniquely determined from the tile ID.

In one embodiment, the system 100 may identify a tile by a quadkey determined based on the tile ID of a tile of the map tile grid. The quadkey, for example, is a one-dimensional array including numerical values. In one embodiment, the quadkey may be calculated or determined by interleaving the bits of the row and column coordinates of a tile in the grid at a specific level. The interleaved bits may be converted to a predetermined base number (e.g., base 10, base 4, hexadecimal). In one example, leading zeroes are inserted or retained regardless of the level of the map tile grid to maintain a constant length for the one-dimensional array of the quadkey. In another example, the length of the one-dimensional array of the quadkey may indicate the corresponding level within the map tile grid 10. In one embodiment, the quadkey is an example of the hash or encoding scheme of the respective geographical coordinates of a geographical data point that can be used to identify a tile in which the geographical data point is located.

The geographic database 121 can be a master geographic database stored in a format that facilitates updating, maintenance, and development. For example, the master geographic database or data in the master geographic database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by a UE 101, a vehicle 105, a device sensor 107, and/or a vehicle sensor 123. The navigation-related functions can correspond to vehicle navigation (e.g., autonomous navigation), pedestrian navigation, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

The processes described herein for visually identifying and/or pairing ride providers and passengers may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 11:
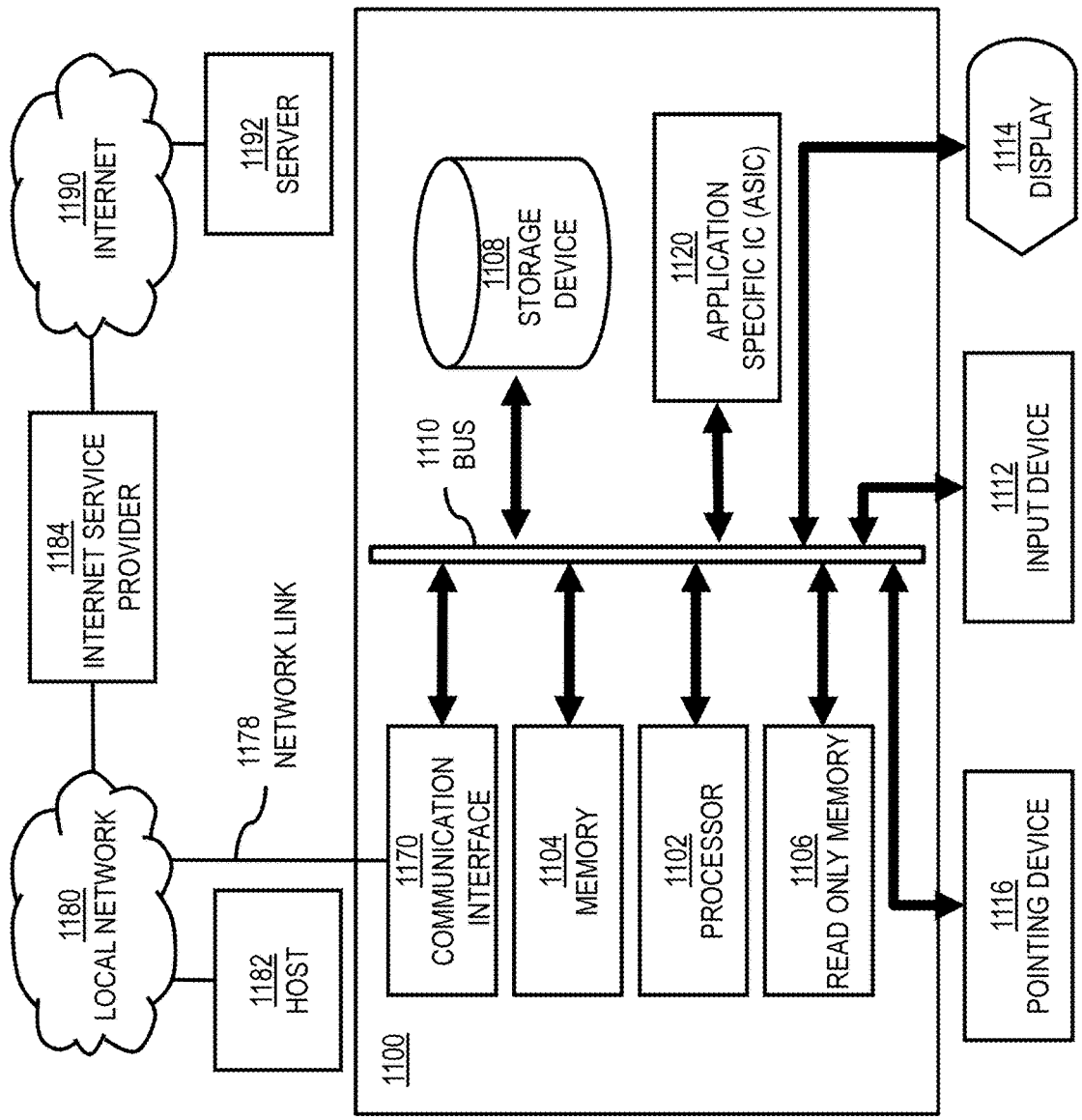
FIG. 11 is a diagram of hardware that can be used to implement example embodiment(s)

FIG. 11 illustrates a computer system 1100 upon which example embodiment(s) of the invention may be implemented. Computer system 1100 is programmed (e.g., via computer program code or instructions) to visually identify and/or pair ride providers and passengers as described herein and includes a communication mechanism such as a bus 1110 for passing information between other internal and external components of the computer system 1100. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 1110 includes one or more parallel conductors of information so that information is transferred quickly among devices coupled to the bus 1110. One or more processors 1102 for processing information are coupled with the bus 1110.

A processor 1102 performs a set of operations on information as specified by computer program code related to visually identifying and/or pairing ride providers and passengers. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1110 and placing information on the bus 1110. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1102, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 1100 also includes a memory 1104 coupled to bus 1110. The memory 1104, such as a random-access memory (RAM) or other dynamic storage device, stores information including processor instructions for visually identifying and/or pairing ride providers and passengers. Dynamic memory allows information stored therein to be changed by the computer system 1100. RAM allows a unit of information stored at a location called a memory address to be stored and retrieved independently of information at neighboring addresses. The memory 1104 is also used by the processor 1102 to store temporary values during execution of processor instructions. The computer system 1100 also includes a read only memory (ROM) 1106 or other static storage device coupled to the bus 1110 for storing static information, including instructions, that is not changed by the computer system 1100. Some memory is composed of volatile storage that loses the information stored thereon when power is lost. Also coupled to bus 1110 is a non-volatile (persistent) storage device 1108, such as a magnetic disk, optical disk, or flash card, for storing information, including instructions, that persists even when the computer system 1100 is turned off or otherwise loses power.

Information, including instructions for visually identifying and/or pairing ride providers and passengers, is provided to the bus 1110 for use by the processor from an external input device 1112, such as a keyboard containing alphanumeric keys operated by a human user, or a sensor. A sensor detects conditions in its vicinity and transforms those detections into physical expression compatible with the measurable phenomenon used to represent information in computer system 1100. Other external devices coupled to bus 1110, used primarily for interacting with humans, include a display device 1114, such as a cathode ray tube (CRT) or a liquid crystal display (LCD), or plasma screen or printer for presenting text or images, and a pointing device 1116, such as a mouse or a trackball or cursor direction keys, or motion sensor, for controlling a position of a small cursor image presented on the display 1114 and issuing commands associated with graphical elements presented on the display 1114. In some embodiments, for example, in embodiments in which the computer system 1100 performs all functions automatically without human input, one or more of external input device 1112, display device 1114 and pointing device 1116 is omitted.

In the illustrated embodiment, special purpose hardware, such as an application specific integrated circuit (ASIC) 1120, is coupled to bus 1110. The special purpose hardware is configured to perform operations not performed by processor 1102 quickly enough for special purposes. Examples of application specific ICs include graphics accelerator cards for generating images for display 1114, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1100 also includes one or more instances of a communications interface 1170 coupled to bus 1110. Communication interface 1170 provides a one-way or two-way communication coupling to a variety of external devices that operate with their own processors, such as printers, scanners, and external disks. In general, the coupling is with a network link 1178 that is connected to a local network 1180 to which a variety of external devices with their own processors are connected. For example, communication interface 1170 may be a parallel port or a serial port or a universal serial bus (USB) port on a personal computer. In some embodiments, communications interface 1170 is an integrated services digital network (ISDN) card or a digital subscriber line (DSL) card or a telephone modem that provides an information communication connection to a corresponding type of telephone line. In some embodiments, a communication interface 1170 is a cable modem that converts signals on bus 1110 into signals for a communication connection over a coaxial cable or into optical signals for a communication connection over a fiber optic cable. As another example, communications interface 1170 may be a local area network (LAN) card to provide a data communication connection to a compatible LAN, such as Ethernet. Wireless links may also be implemented. For wireless links, the communications interface 1170 sends or receives or both sends and receives electrical, acoustic, or electromagnetic signals, including infrared and optical signals, that carry information streams, such as digital data. For example, in wireless handheld devices, such as mobile telephones like cell phones, the communications interface 1170 includes a radio band electromagnetic transmitter and receiver called a radio transceiver. In certain embodiments, the communications interface 1170 enables connection to the communication network 113 for visually identifying and/or pairing ride providers and passengers.

The term computer-readable medium is used herein to refer to any medium that participates in providing information to processor 1102, including instructions for execution. Such a medium may take many forms, including, but not limited to, non-volatile media, volatile media, and transmission media. Non-volatile media include, for example, optical or magnetic disks, such as storage device 1108. Volatile media include, for example, dynamic memory 1104.

Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization, or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

Network link 1178 typically provides information communication using transmission media through one or more networks to other devices that use or process the information. For example, network link 1178 may provide a connection through local network 1180 to a host computer 1182 or to equipment 1184 operated by an Internet Service Provider (ISP). ISP equipment 1184 in turn provides data communication services through the public, world-wide packet-switching communication network of networks now commonly referred to as the Internet 1190.

A computer called a server host 1192 connected to the Internet hosts a process that provides a service in response to information received over the Internet. For example, server host 1192 hosts a process that provides information representing video data for presentation at display 1114. It is contemplated that the components of system can be deployed in various configurations within other computer systems, e.g., host 1182 and server 1192.

FIG. 12 illustrates a chip set 1200 upon which example embodiment(s) of the invention may be implemented. Chip set 1200 is programmed to visually identify and/or pair ride providers and passengers as described herein and includes, for instance, the processor and memory components described with respect to FIG. 11 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip.

In one embodiment, the chip set 1200 includes a communication mechanism such as a bus 1201 for passing information among the components of the chip set 1200. A processor 1203 has connectivity to the bus 1201 to execute instructions and process information stored in, for example, a memory 1205. The processor 1203 may include one or more processing cores with each core configured to perform independently. A multi-core processor enables multiprocessing within a single physical package. Examples of a multi-core processor include two, four, eight, or greater numbers of processing cores. Alternatively, or in addition, the processor 1203 may include one or more microprocessors configured in tandem via the bus 1201 to enable independent execution of instructions, pipelining, and multithreading. The processor 1203 may also be accompanied with one or more specialized components to perform certain processing functions and tasks such as one or more digital signal processors (DSP) 1207, or one or more application-specific integrated circuits (ASIC) 1209. A DSP 1207 typically is configured to process real-world signals (e.g., sound) in real time independently of the processor 1203. Similarly, an ASIC 1209 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1203 and accompanying components have connectivity to the memory 1205 via the bus 1201. The memory 1205 includes both dynamic memory (e.g., RAM, magnetic disk, writable optical disk, etc.) and static memory (e.g., ROM, CD-ROM, etc.) for storing executable instructions that when executed perform the inventive steps described herein to visually identify and/or pair ride providers and passengers. The memory 1205 also stores the data associated with or generated by the execution of the inventive steps.

Figure 13:
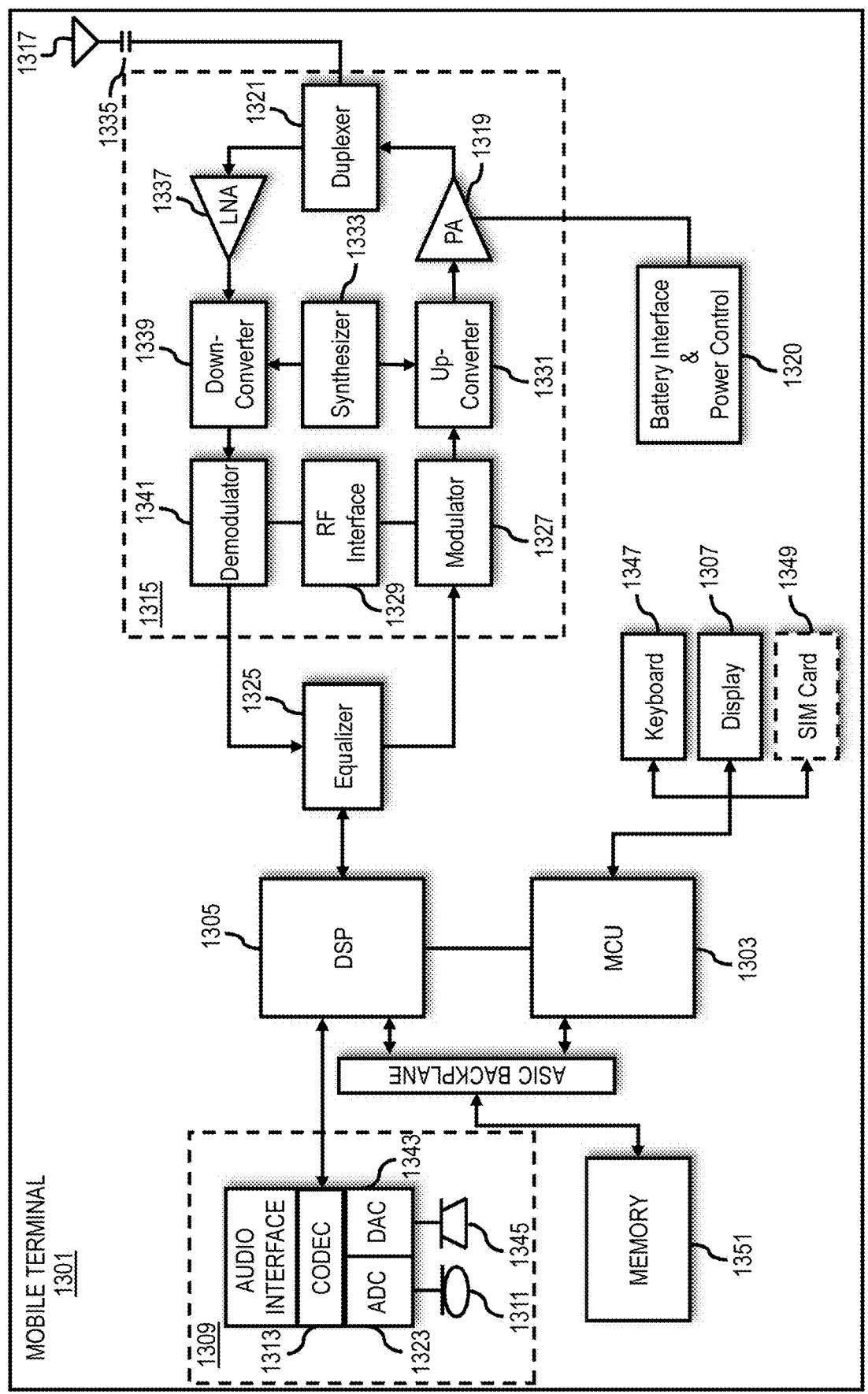
FIG. 13 is a diagram of a mobile terminal (e.g., handset or vehicle or part thereof) that can be used to implement example embodiment(s).

FIG. 13 is a diagram of exemplary components of a mobile terminal 1301 (e.g., a UE 101, a vehicle 105, or a component thereof) capable of operating in the system of FIG. 1, according to example embodiment(s). Generally, a radio receiver is often defined in terms of front-end and back-end characteristics. The front-end of the receiver encompasses all of the Radio Frequency (RF) circuitry whereas the back-end encompasses all of the base-band processing circuitry. Pertinent internal components of the telephone include a Main Control Unit (MCU) 1303, a Digital Signal Processor (DSP) 1305, and a receiver/transmitter unit including a microphone gain control unit and a speaker gain control unit. A main display unit 1307 provides a display to the user in support of various applications and mobile station functions that offer automatic contact matching. An audio function circuitry 1309 includes a microphone 1311 and microphone amplifier that amplifies the speech signal output from the microphone 1311. The amplified speech signal output from the microphone 1311 is fed to a coder/decoder (CODEC) 1313.

A radio section 1315 amplifies power and converts frequency to communicate with a base station, which is included in a mobile communication system, via antenna 1317. The power amplifier (PA) 1319 and the transmitter/modulation circuitry are operationally responsive to the MCU 1303, with an output from the PA 1319 coupled to the duplexer 1321 or circulator or antenna switch, as known in the art. The PA 1319 also couples to a battery interface and power control unit 1320.

In use, a user of mobile station 1301 speaks into the microphone 1311 and his or her voice along with any detected background noise is converted into an analog voltage. The analog voltage is then converted into a digital signal through the Analog to Digital Converter (ADC) 1323. The control unit 1303 routes the digital signal into the DSP 1305 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wireless fidelity (WiFi), satellite, and the like.

The encoded signals are then routed to an equalizer 1325 for compensation of any frequency-dependent impairments that occur during transmission though the air such as phase and amplitude distortion. After equalizing the bit stream, the modulator 1327 combines the signal with a RF signal generated in the RF interface 1329. The modulator 1327 generates a sine wave by way of frequency or phase modulation. In order to prepare the signal for transmission, an up-converter 1331 combines the sine wave output from the modulator 1327 with another sine wave generated by a synthesizer 1333 to achieve the desired frequency of transmission. The signal is then sent through a PA 1319 to increase the signal to an appropriate power level. In practical systems, the PA 1319 acts as a variable gain amplifier whose gain is controlled by the DSP 1305 from information received from a network base station. The signal is then filtered within the duplexer 1321 and optionally sent to an antenna coupler 1335 to match impedances to provide maximum power transfer. Finally, the signal is transmitted via antenna 1317 to a local base station. An automatic gain control (AGC) can be supplied to control the gain of the final stages of the receiver. The signals may be forwarded from there to a remote telephone which may be another cellular telephone, other mobile phone or a landline connected to a Public Switched Telephone Network (PSTN), or other telephony networks.

Voice signals transmitted to the mobile station 1301 are received via antenna 1317 and immediately amplified by a low noise amplifier (LNA) 1337. A down-converter 1339 lowers the carrier frequency while the demodulator 1341 strips away the RF leaving only a digital bit stream. The signal then goes through the equalizer 1325 and is processed by the DSP 1305. A Digital to Analog Converter (DAC) 1343 converts the signal and the resulting output is transmitted to the user through the speaker 1345, all under control of a Main Control Unit (MCU) 1303—which can be implemented as a Central Processing Unit (CPU) (not shown).

The MCU 1303 receives various signals including input signals from the keyboard 1347. The keyboard 1347 and/or the MCU 1303 in combination with other user input components (e.g., the microphone 1311) comprise a user interface circuitry for managing user input. The MCU 1303 runs a user interface software to facilitate user control of at least some functions of the mobile station 1301 to visually identify and/or pair ride providers and passengers. The MCU 1303 also delivers a display command and a switch command to the display 1307 and to the speech output switching controller, respectively. Further, the MCU 1303 exchanges information with the DSP 1305 and can access an optionally incorporated SIM card 1349 and a memory 1351. In addition, the MCU 1303 executes various control functions required of the station. The DSP 1305 may, depending upon the implementation, perform any of a variety of conventional digital processing functions on the voice signals. Additionally, DSP 1305 determines the background noise level of the local environment from the signals detected by microphone 1311 and sets the gain of microphone 1311 to a level selected to compensate for the natural tendency of the user of the mobile station 1301.

The CODEC 1313 includes the ADC 1323 and DAC 1343. The memory 1351 stores various data including call incoming tone data and is capable of storing other data including music data received via, e.g., the global Internet. The software module could reside in RAM memory, flash memory, registers, or any other form of writable computer-readable storage medium known in the art including non-transitory computer-readable storage medium. For example, the memory device 1351 may be, but not limited to, a single memory, CD, DVD, ROM, RAM, EEPROM, optical storage, or any other non-volatile or non-transitory storage medium capable of storing digital data.

An optionally incorporated SIM card 1349 carries, for instance, important information, such as the cellular phone number, the carrier supplying service, subscription details, and security information. The SIM card 1349 serves primarily to identify the mobile station 1301 on a radio network. The card 1349 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
   receiving location data indicating that a driver vehicle is within a proximity threshold of a passenger pickup location;
   initiating an activation of a camera of a passenger device to present live imagery on the passenger device;
   processing sensor data collected from one or more sensors of the passenger device to determine a rotation vector indicating a pointing direction of the passenger device;
   determining a new direction to point the passenger device to capture the driver vehicle in a field of view of the camera based on the rotation vector and the location data; and
   providing output data for presenting a representation of the new direction in a user interface of the passenger device.

2. The method of claim 1, further comprising:
   processing the live imagery to detect the driver vehicle;
   wherein the output data further includes data for highlighting the driver vehicle in the user interface of the passenger device.

3. The method of claim 1, further comprising:
   processing device location data collected from a location sensor of the passenger device to determine that the passenger device is within an approach proximity of the driver vehicle; and
   processing the live imagery to perform a facial recognition of a driver of the driver vehicle.

4. The method of claim 3, further comprising:
   determining a positive identification of the driver based on comparing the facial recognition to previously stored driver data,
   wherein an indication of the positive identification is presented in the user interface of the passenger device.

5. The method of claim 1, further comprising:
   retrieving driver data associated with the driver vehicle; and
   providing the driver data in the output data for presentation in the user interface.

6. The method of claim 5, wherein the driver data includes a driver image, driver information, vehicle image, vehicle information, or a combination thereof.

7. The method of claim 1, further comprising:
   determining an absolute orientation of the passenger device based on the rotation vector and an Earth frame of reference,
   wherein the pointing direction is further based on the absolute orientation.

8. The method of claim 1, further comprising:
processing the live imagery to determine that the driver vehicle is within the field of view of the passenger device; and
presenting an indication in the user interface that the driver vehicle is within the field of view.

9. The method of claim 8, wherein the indication comprises removing the representation of the pointing direction from the user interface.

10. The method of claim 1, further comprising:
initiating the receiving of the location data, the activation of the camera, the processing of the sensor data, the determining of the pointing direction, the providing of the output data, or a combination thereof based on receiving a ride request associated with the driver vehicle and the passenger device.

11. The apparatus of claim 1, wherein the apparatus is further caused to:
retrieve passenger data associated with the passenger; and
provide the passenger data in the output data for presentation in the user interface.

12. The apparatus of claim 11, wherein the passenger data includes a passenger image, passenger information, or a combination thereof.

13. An apparatus comprising:
at least one processor; and
at least one memory including computer program code for one or more programs,
the at least one memory and the computer program code configured to, with the at least one processor, cause the apparatus to perform at least the following,
initiate an activation of a camera of a driver device to present live imagery on the driver device;
process sensor data collected from one or more sensors of the driver device to determine a rotation vector indicating a current pointing direction of the driver device;
determine a new direction to point the driver device to capture a passenger associated with a passenger pickup location in a field view of the camera based on the rotation vector and location data of the passenger or a passenger device associated with the passenger; and
provide output data for presenting a representation of the new direction in a user interface of the driver device.

14. The apparatus of claim 13, wherein the apparatus is further caused to:
process the live imagery to detect the passenger;
wherein the output data further includes data for highlighting the passenger in the user interface of the driver device.

15. The apparatus of claim 13, wherein the apparatus is further caused to:
process the live imagery to perform a facial recognition of the passenger; and
determine a positive identification of the passenger based on comparing the facial recognition to previously stored passenger data,
wherein an indication of the positive identification is presented in the user interface of the driver device.

16. A non-transitory computer-readable storage medium, carrying one or more sequences of one or more instructions which, when executed by one or more processors, cause an apparatus to at least perform the following steps:
receiving location data indicating that a driver vehicle is within a proximity threshold of a passenger pickup location;
initiating an activation of a camera of a passenger device to present live imagery on the passenger device;
processing sensor data collected from one or more sensors of the passenger device to determine a rotation vector indicating a pointing direction of the passenger device;
determining a new direction to point the passenger device to capture the driver vehicle in a field of view of the camera based on the rotation vector and the location data; and
providing output data for presenting a representation of the new direction in a user interface of the passenger device.

17. The non-transitory computer-readable storage medium of claim 16, wherein the apparatus is caused to further perform:
processing the live imagery to detect the driver vehicle;
wherein the output data further includes data for highlighting the driver vehicle in the user interface of the passenger device.

18. The non-transitory computer-readable storage medium of claim 16, wherein the apparatus is caused to further perform:
processing device location data collected from a location sensor of the passenger device to determine that the passenger device is within an approach proximity of the driver vehicle; and
processing the live imagery to perform a facial recognition of a driver of the driver vehicle.

19. The non-transitory computer-readable storage medium of claim 18, wherein the apparatus is caused to further perform:
determining a positive identification of the driver based on comparing the facial recognition to previously stored driver data,
wherein an indication of the positive identification is presented in the user interface of the passenger device.

20. The non-transitory computer-readable storage medium of claim 16, wherein the apparatus is caused to further perform:
retrieving driver data associated with the driver vehicle; and
providing the driver data in the output data for presentation in the user interface.

* * * * *